JOHN R. SPENCER
JAMES H. CHEEK
WALTON D. GREATHOUSE
INVENTORS.

JOHN R. SPENCER
JAMES H. CHEEK
WALTON D. GREATHOUSE
INVENTORS

BY Van D. Harrison, Jr.

AGENT

Oct. 15, 1968     J. R. SPENCER ET AL     3,405,507
VOLUME COMPENSATION IN VAPOR SORPTION SYSTEMS
Filed Feb. 23, 1967

JOHN R. SPENCER
JAMES H. CHEEK
WALTON D. GREATHOUSE
              INVENTORS

BY *Van D. Harrison, Jr.*

AGENT

JOHN R. SPENCER
JAMES H. CHEEK
WALTON D. GREATHOUSE
INVENTORS.

BY Van D. Harrison, Jr.

AGENT

United States Patent Office 3,405,507
Patented Oct. 15, 1968

1

3,405,507
VOLUME COMPENSATION IN VAPOR
SORPTION SYSTEMS
John R. Spencer, James H. Cheek, and Walton D. Greathouse, Houston, Tex., assignors to Continental Oil Company, Ponca City, Okla., a corporation of Delaware
Continuation-in-part of application Ser. No. 412,799, Nov. 20, 1964. This application Feb. 23, 1967, Ser. No. 618,192
46 Claims. (Cl. 55—62)

ABSTRACT OF THE DISCLOSURE

Method and apparatus for removing condensables from gases comprising three adsorber beds coupled with two volume-temperature compensators (regenerative heat exchangers). Adsorber beds are sequentially switched to a sorption, heating, and cooling circuit. Correspondingly, a volume-temperature compensator is switched into the flow path of cooling gas from the bed being cooled and a second compensator in the flow path of gas to the bed being heated. Condensing and liquid collection apparatus are included in the heating circuit to remove vaporized condensables in a heated gas flowing through the bed in the heating phase. Prior to switching the hot regenerated bed and associated compensator into the cooling circuit, the gas therein is displaced into the spent bed next to be heated. Volume-pressure variations of gas in the heating circuit are minimized. Additional apparatus and method are provided, if desired, to further accommodate volume-temperature changes in the heating circuit.

This application is a continuation-in-part of the copending application of the present inventors, entitled "Volume Compensation in Vapor Sorption Systems," Ser. No. 412,799, filed Nov. 20, 1964, and now abandoned, which in turn is a continuation-in-part of the application Ser. No. 270,318, by the present inventors, filed Apr. 3, 1963, and now abandoned.

This invention relates to separation of condensable vapor from gas by sorption. In one of its aspects, the invention relates to method and apparatus for reducing volume changes and pressure surges in regenerating sorbent beds utilized in the sorption system. In another aspect, the invention relates to method and apparatus for retaining a greater portion of regeneration fluid within a closed cycle regeneration loop during cyclic recovery of a condensable vapor from gas by sorption. In still another aspect, this invention relates to method and apparatus for conserving heat necessary to regenerate a sorbent after it has been used to remove a vapor from a gas.

It is known that gasoline, light hydrocarbons and water can be removed from natural gas by sorption. The use of solids to adsorb vaporized condensables, such as hydrocarbons, dates back to an old charcoal process. As used herein, the term, vaporized condensables, or condensables, connotes a readily condensable gas. Gasoline liquids have been recovered in dry bed dehydrators for many years. Present short cycle plants utilize various adsorbents. They also utilize multiple beds to obtain a continuous process,

2 i.e., one or more beds are adsorbing while one or more beds are being regenerated and cooled. Most of the processes use heated gas to regenerate the spent bed followed by cooling of the regeneration gas to condense a portion of the hydrocarbons and water therein. There are two basic types of systems: open or closed cycle regeneration.

In the open cycle system the raw gas flows into the top of the activated adsorbent bed or beds. It passes through and around the adsorbent which adsorbs the heavy hydrocarbons and water from the gas. The residue gas flows out the bottom of the tower, through a heat exchanger and to sales. A portion of the inlet gas is taken for regenerating the bed which has been loaded with hydrocarbon from previous exposure. The regeneration gas passes through a heater; then the hot gas is passed through the loaded bed. This desorbs the heavy hydrocarbons and water which pass out the bottom of the bed as vaporized condensables. The vapor is cooled to condense some of the hydrocarbon and water, which is then removed to recover the hydrocarbon liquid. The remaining gas is returned to the main inlet raw gas stream. After regeneration, valves are switched so that cool gas cools the heated bed. The cool active bed is then switched into adsorption service and an exposed bed is switched to regeneration to complete a cycle.

A closed cycle system operates essentially as the open cycle as far as the main stream of gas is concerned. The regeneration gas, however, is circulated by means of a mechanical gas pump in a closed cycle. A breather line allows expansion of the regeneration volume as it is heated.

There are several variations of the above systems, but in all cases a large portion of the enriched, cooled regeneration gas that is in equilibrium with the condensed liquid is recycled to another bed by breathing, or is displaced in the residue gas. This loss is replaced by a lean gas which in turn reduces the partial pressure and recovery of the heavy components in the condensing stream. The recycle adds to the load on the beds and reduces capacity and recovery by almost an equal amount. Most of the systems use conventional heat exchangers or aerial coolers to recover heat or cool the residue gas.

When the regeneration of a bed starts, the unadsorbed gas in the void spaces and piping of the bed is near ambient temperature and is primarily low molecular weight compounds, usually methane and ethane. These gases also retard condensation of products during regeneration. This lean gas constitutes the major portion of the gas in the regeneration system. This volume of gas is heated as the regeneration proceeds and must behave, with slight deviation, in accordance with the Ideal Gas Law. The pressure is usually held constant and provision is made for the gas to expand through an equalizer or breather line. If the starting temperature of the bed were 540 deg. R. (80 deg. F.) and were heated to 1040 deg. R. (600 deg. F.), the volume of gas would expand by a factor of about 1040/540, or 1.93. Adsorbed gases are also evolved from the bed during the heating and contribute to the gas volume that must expand since these products are not all condensed in the cooling system. Practically all of the products carried out of the regeneration system by the expansion are not recovered.

Accordingly, it is an object of this invention to provide method and apparatus for increasing recovery of condensable vapor from a gas. Another object of this invention is to provide method and apparatus whereby pressure and volume changes in the sorption system are reduced to a minimum in changing from one cycle to a succeeding cycle. Still another object of this invention is to provide method and apparatus whereby pressure changes and volume changes are kept to a minimum in a closed regeneration system during the regeneration of a spent sorbent bed. Still another object of this invention is to provide method and apparatus for conserving heat used in regeneration of a sorbent bed. Still another object of this invention is to provide method and apparatus for reducing the loss of rich regeneration gas by thermal volume changes in a closed regeneration cycle sorption system. Still another object of this invention is to provide method and apparatus whereby the sorbent adsorbs increased quantities of vapor and the efficiency of recovering condensable vapor is increased. Still another object of this invention is to provide method and apparatus whereby the rate of flow of fluids in the closed regeneration system and the rate of flow of incoming raw gas is maintained at a desired ratio.

Other aspects, objects, and the several advantages of the invention will become apparent upon study of this disclosure, the appended claims, and the drawings, in which:

Figure 1:
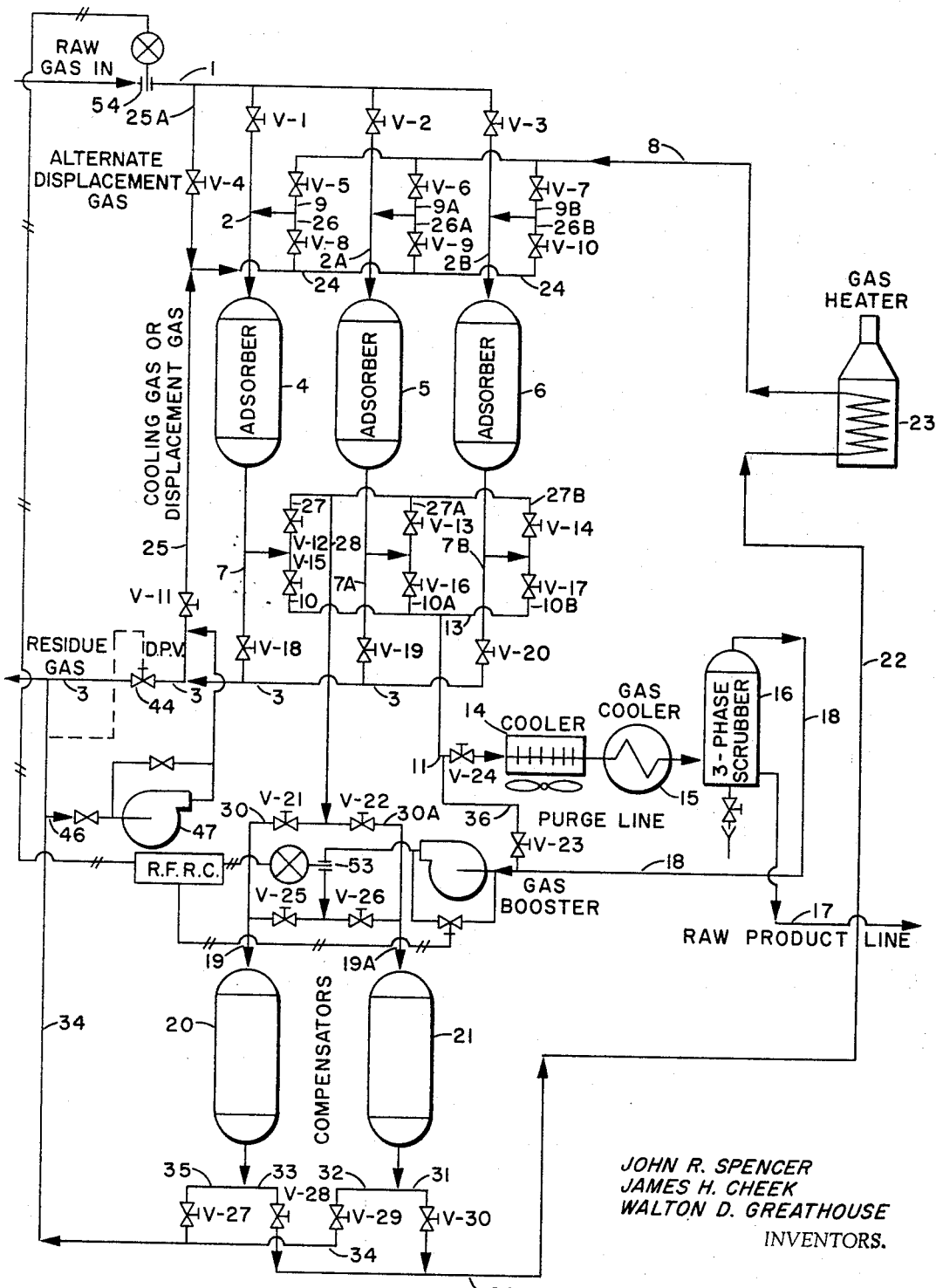
FIGURE 1 is a schematic drawing of two embodiments of this invention in which two-way valves are used.

According to our invention, there is provided method and apparatus for removing vaporized condensables from a gas, such as gasoline components from natural gas, by sorption of said condensables cyclically in one of a plurality of beds of solid sorbent wherein each of said beds of solid sorbent is cyclically regenerated by passage therethrough of a heated regeneration fluid in a closed system, there being provided a compensator in the closed regeneration system so that regeneration fluid is passed first to the bed of solid sorbent which is to be regenerated and thence to the compensator.

As the sorbent bed is heated, condensables vaporize from it and uncondensed gas present expands, both causing an increase in volume. The compensator, however, causes the vaporized condensables and expanded gas to compress within it thus offsetting or compensating for the increased volume. A preferred embodiment of this invention is to utilize as a compensator a regenerative heat exchanger or accumulator which, at the beginning of the regeneration phase, is hot but which cools during regeneration by giving up heat to regeneration gas circulated through it to a gas heater. The void volume of the compensator is matched to the void volume of the regenerating bed so that as condensables vaporize and gas expands in the regenerating bed the gas volume in the compensator cools and diminishes and the total volume of the system and correspondingly the pressure remains substantially the same. If the bed being regenerated is at a cool temperature of $T_1$ at the beginning of the regeneration phase and the temperature of the hot compensator is $T_2$, the temperature of the two will be reversed to substantially $T_2$ and $T_1$ at the end of the regeneration phase.

In a more specific embodiment, this invention comprises placing two specifically matched compensators in the process flow of a dry bed sorption hydrocarbon recovery system. The enriched gas in the regeneration phase is in a closed system which includes a cooler and a scrubber and is transferred by displacement from one regeneration train to another as required. The cooling phase of the system is open and uses residue gas or inlet gas to cool the adsorbent bed. The compensators and the sorbent bed vessels are manifolded and connected by program controlled valves in such a manner that the main gas stream flows through a cool, active sorbent bed where water and heavy hydrocarbons are adsorbed and the remaining gas goes to the residue line. One of the compensators is connected downstream of a hot regenerated bed being cooled. This compensator is storing heat. The other compensator, heated from previous service, is connected downstream of a bed being regenerated and upstream of the regeneration gas heater. This compensator supplies some heat to the regeneration stream prior to the gas heater, and is being cooled. Periodically, the relative positions of the sorbent beds, the compensators and the flow of gases in each of the beds and compensators is shifted so that each bed in succession is regenerated, cooled and then put in the sorption phase. Similarly, each compensator in succession is heated by gas flowing from the bed being cooled and is cooled by gas flowing to the bed being regenerated.

This invention further provides method and apparatus for varying the closed regeneration system volume so as to retain a greater proportion of vapor-enriched regeneration fluid within the system; also method and apparatus whereby a portion of all of the regeneration gas in a hot, regenerated bed of solid sorbent is displaced by a gas to a bed of solid sorbent which already contains sufficient adsorbed condensables from a previous cycle of adsorption to be considered "spent" and which is to be regenerated. The "spent" sorbent adsorbs additional condensables from the regeneration fluid before it enters the regeneration cycle.

In our copending application the term "regenerative heat exchange zone" is used, whereas in this disclosure the term "compensator" is used. These terms are interchangeable in that a "heat exchange zone" is one embodiment of a "compensator." Further, the term "compensator" is considered in our description to embrace the concept both of thermal and of volumetric compensation in a closed regeneration system and in the complete recovery system. The concept of volumetric compensation, however, forms the broad basis of our invention. The compensators do however serve the additional function of regenerative heat exchangers as disclosed herein.

For purposes of clarity in understanding our invention, the term "cycle" should be considered as including a sequence of operations in which one bed absorbs condensables from a raw inlet gas, a second bed simultaneously is regenerated, a third bed simultaneously is cooled, and the beds subsequently are then switched by means of valves to different functions in a new cycle. A cycle also can include the additional phase, which is called the "purging" phase, wherein regeneration gas is displaced into the adsorbent bed which is about to be rengerated. One method and apparatus can perhaps be more clearly understood if the purging phase is considered to precede the phases of adsorption, regeneration and cooling which proceed simultaneously in point of time.

The adsorption of components from a hydrocarbon mixture passed through a sorbent bed made up of small particles or fibers, assumes a zonal distribution within the bed. Expressed more explicitly, as the bed is traversed longitudinally by a hydrocarbon mixture, the concentration of each hydrocarbon component in the sorbent bed will approach a maximum and then decline. This locus of maximum concentration will differ for each component and will advance through the sorbent zone in the direction of hydrocarbon flow. This phenomenon occurs in both the adsorbing and desorbing phases of a sorbent bed.

The heating or cooling by a fluid stream of a permeable bed, made up of small particles or fibers, also takes the form of a frontal advance of the temperature zone. A bed can be almost entirely heated or cooled before the respective rise or fall of temperature is evidenced at the exit of the bed. This characteristic is used in this invention to produce a substantially stable volume in the closed regeneration system during the heating of an adsorbent bed and also in shifting rich regeneration gas from the regeneration train to a sorbent bed that is to be regenerated (purging step), the latter being described in more detail hereinafter. Heat is also conserved in this type of operation. To amplify on the previous discussion, volume and heat compensation is accomplished in the following manner:

(1) The conditions in the cooling system, the heating system and the associated piping are maintained at a relatively steady state. The volume of the gas in this portion of the system remains practically unchanged.

(2) The gas that occupies the available void space in the adsorbent vessel is cool at the start of the regeneration. At the same time, an equal volume of gas, heated to near the maximum regeneration temperature occupies the compensator that is in series with the adsorbent vessel. As a volume of the gas in the adsorbent vessel is heated, an equal volume is cooled in the compensator. As previously pointed out, this simultaneous cooling and heating of the circulating stream maintains substantially a volume balance. Another compensator simultaneously is storing heat from a regenerated bed that is cooling in preparation for use in the next regeneration cycle.

(3) The heat recovered by the above steps is conserved since it is returned to the regeneration gas stream.

Referring now to the drawings, and to FIGURE 1 in particular, raw gas containing vapor to be removed is passed into the system by way of conduit 1 to one of adsorbers 4, 5 and 6; in this phase of the cycle, it will be assumed that adsorber 6 is "on-stream" and conduit 2B is in service. During later phases of the cycle, conduits 2 and 2A serve to pass gas to adsorbers 4 and 5, respectively. Gas from which the vapor is removed by sorption is removed from adsorber 6 by way of conduit 7B and passed from the system by way of conduit 3. In later phases of the cycle, conduits 7A and 7 are used for the purpose of conduit 7B. This comprises the "on-stream" or treating portion of the system.

When an adsorber becomes "spent" or saturated with vapors, it must be regenerated as by passage therethrough of a heated gas to remove adsorbed vapors. The closed regeneration system will now be described. Heated gas is passed by way of conduits 8 and 9A to adsorber 5; conduits 9 and 9B serve a similar function in subsequent phases of the cycle, with respect to adsorbers 4 and 6. This heated gas removes absorbed material, and the resulting mixture passes by way of conduits 10A and 11 (and conduits 10 and 11 or 10B and 11 during subsequent phases) to cooler 14, which conventionally can be a finned air cooler. The mixture then passes to gas cooler 15, which can be, for example, a shell and tube exchanger. Vapors contained in the gas are thus condensed, and are then phase separated in scrubber 16. Condensate is removed from separator 16 by way of conduit 17, and can be further separated to provide, e.g., natural gas liquid products. The cleaned gas passes by way of conduit 18, through a booster or circulating pump and conduit 19 to compensator 20. Conduit 19A serves a similar function, in a later cycle phase, for compensator 21. Compensators 20 and 21 contain a permeable porous inert mass, which in compensator 20 has been heated by a previous cycle phase. Thus, the gas introduced by way of conduits 18 and 19 is heated in compensator 20 and is then passed by way of conduits 33 and 22 to heater 23. Heater 23 adds make-up heat to the gas, which is then ready for re-use for regeneration by way of conduit 8. This comprises the closed circuit regeneration portion of the system.

When a sorbent bed has been regenerated by passage through it of hot gas, as just described, the sorbent is raised to a high temperature. Prior to again placing the bed on "on-stream" duty, the sorbent should be cooled for more efficient adsorption. Cool residue gas, or alternatively cool raw gas or an extraneous cool gas, is passed by way of conduits 25 and 24 or alternatively conduits 25A and 24 to the just-heated adsorbent bed, in this instance adsorber 4. Conduits 26 is also used in this instance, as will be conduits 26A and 26B in a subsequent phase of the cycle. The cool gas removes the heat from the adsorbent in adsorber 4, and is in turn heated itself. This heat is carried by the gas by way of conduits 27, 28, 30A and 19A to compensator 21. Conduits 27A or 27B, with conduits 30 or 30A and 19 or 19A along with conduit 28 serve similar functions in subsequent phases of the cycle. The mass in compensator 21 is thus heated, and the cooled gas leaves by way of conduits 32 and 34. Where raw gas or residue gas are used for cooling, the gas in conduit 34 can conveniently be added to conduit 3 as shown. Where an extraneous cooling gas is used, the gas in conduit 34 can be vented. Conduits 35 and 34 serve a function similar to conduits 32 and 34 in a later phase of the cycle. This completes the description of the cooling phase. As will be appreciated, each of the adsorbers 4–6 sequentially undergoes each of the above described phases during a complete cycle. Compensators 20 and 21 are being sequentially heated and cooled during each succeeding phase. The cycle phases described herein can be conveniently effected by manipulation of valves V–1 through V–22 and V–25 through V–30. The function of valves V–23 and V–24 is described subsequently.

At the end of the regeneration phase of any adsorbent bed, the heated bed, piping and the attendant compensator are filled with rich gas from the hydrocarbon condensing system. A cool, active bed must be put into service. At the same time the spent bed and the other heat exchanger are filled with lean gas. In order to preserve the integrity of the rich gas, it is necessary to displace the rich gas from the hot bed and the attendant compensator into the spent bed and the other compensator simultaneously displacing the lean gas from the latter vessels. This is the "purge" or displacement phase of the cycle noted previously, and is an important step in the overall recovery process. The basis for this step lies in the following considerations. The amount of each component of a hydrocarbon vapor mixture adsorbed by a sorbent at equilibrium is dependent in part upon the nature of the sorbent, the temperatures of the sorbent and hydrocarbon mixture and the partial pressure of each component in the hydrocarbon mixture. If the sorbent has reached equilibrium with a lean gas mixture, that is, a mixture containing only small quantities of heavier hydrocarbons, the sorbent is still capable of adsorbing additional quantities of heavier hydrocarbons from a vapor which is richer in these heavier components and in which the corresponding partial pressures are higher. Thus, for example, assume at the end of a regular adsorption, regeneration and cooling phase adsorber 5 and compensator 20 and the associate piping are filled with rich gas and adsorber 6 and compensator 21 are filled with a lean gas. Adsorber 4 must be put in service. In order to preserve the integrity of the rich gas in hot adsorber 5 and compensator 20 it is necessary to displace the rich gas from adsorber 5 and compensator 20 through heater 23 into cold adsorber 6, coolers 14 and 15, separator 16 and hot compensator 21 while simultaneously displacing the lean gas from adsorber 6 and compensator 21.

When the rich regeneration gas (in the displacement phase) passes into the saturated sorbent bed 6, it first will be cooled to the temperature of the bed 6 as it traverses a narrow section of the bed. The cooled rich gas then travels through the remainder of the bed 6 where it is largely stripped of its rich condensables before moving on into the compensator 21.

During the displacing, or purge phase, the rich gas coolers 14 and 15 and scrubber 16 can be bypassed by way of conduit 36 in order to make the displacing volumes about equal. This can be done by closing valve 24 and opening valve 23. The displacement is continued until the transfer is just completed. At this point the rich gas reaches the exit of the hot compensator 21, the valves are switched to close the regeneration cycle to normal operation and to permit the lean gas from the other compensator 20 to flow to the residue line. If the vessels and piping volumes are carefully matched, the lean gas reaches the exit of the cool compensator 20 at the time the displacement is completed.

It is possible by operating in this manner to adsorb on the sorbent additional quantities of condensable vapor over that adsorbed from the raw gas stream. This indirectly makes possible the use of sorbent beds smaller than would otherwise be possible to condense equal volumes of condensable vapors.

Before beginning the displacement phase, it is usually desirable to discontinue cooling of the regenerated sorbent zone by closing inlet valve 8 to adsorber 4 so that any delay in the heating of adsorber 5 which is being regenerated is correct. A temperature sensing element (not shown) in adsorber 5 can indicate when this adsorber body has been completely traversed by the heating zone. The temperature sensing element may also be employed to control the next step of switching.

The above bed switch and displacement can be initiated by a temperature signal from the bed that has been heating, e.g., through the use of the temperature sensing element previously discussed. It is preferred that at the end of the displacement, the activation of the next valve sequence be initiated by a signal from a gas detector at the exit of the compensators which detects the rich gas front. This does not exclude time controlled valve sequence programs. The displacement of the rich and lean gases from the respective beds is not ordinarily perfect due to the complexity of flow in the porous and permeable beds and due to imperfect match in void volumes of the two systems. Also, perfect heat transfer is not obtained in the compensators. For this reason, there is ordinarily a small loss of rich gas from the closed cycle which is replaced by lean gas.

Table I indicates the manipulation of valves V-1 through V-30 through a complete cycle including the step of shutting down the cooling sorbent bed and allowing the heating of the regenerating bed to be completed.

TABLE I.—PROCESS VESSEL AND VALVE SEQUENCE

| Adsorbent Vessels | | | Compensators | | Valves* | | | | | | | | | | | | | | |
|---|---|---|---|---|---|---|---|---|---|---|---|---|---|---|---|---|---|---|---|
| No. 4 | No. 5 | No. 6 | No. 20 | No. 21 | V-1 | V-2 | V-3 | V-5 | V-6 | V-7 | V-8 | V-9 | V-10 | V-12 | V-13 | V-14 | V-15 | V-16 |
| Cool. | Regen. | Ads. | Cool. | Heat. | C | C | O | C | O | C | O | C | C | O | C | C | C | O |
| NF | Regen. | Ads. | Cool. | NF | C | C | O | C | O | C | C | C | C | O | C | C | C | O |
| Ads. | Disp. | Disp. | Disp. | Disp. | O | C | C | C | C | O | C | O | C | C | O | C | C | C |
| Ads. | Cool. | Regen. | Heat. | Cool. | O | C | C | C | C | O | C | O | C | C | O | C | C | C |
| Ads. | NF | Regen. | NF | Cool. | O | C | C | C | C | O | C | C | C | C | O | C | C | C |
| Disp. | Ads. | Disp. | Disp. | Disp. | C | O | C | O | C | C | C | C | O | C | C | O | O | C |
| Regen. | Ads. | Cool. | Cool. | Heat. | C | O | C | O | C | C | C | C | C | C | C | O | O | C |
| Regen. | Ads. | NF | Cool. | NF | C | O | C | O | C | C | C | C | C | C | C | O | O | C |
| Disp. | Disp. | Ads. | Disp. | Disp. | C | C | O | C | O | C | O | C | C | O | C | C | C | O |

| Adsorbent Vessels | | | Compensators | | Valves* | | | | | | | | | | | | | | |
|---|---|---|---|---|---|---|---|---|---|---|---|---|---|---|---|---|---|---|---|
| No. 4 | No. 5 | No. 6 | No. 20 | No. 21 | V-17 | V-18 | V-19 | V-20 | V-21 | V-22 | V-23 | V-24 | V-25 | V-26 | V-27 | V-28 | V-29 | V-30 |
| Cool. | Regen. | Ads. | Cool. | Heat. | C | C | C | O | C | O | C | O | O | C | C | O | O | C |
| NF | Regen. | Ads. | Cool. | NF | C | C | C | O | O | O | C | O | O | C | C | O | O | C |
| Ads. | Disp. | Disp. | Disp. | Disp. | O | O | C | C | O | C | O | C | C | O | C | O | O | C |
| Ads. | Cool. | Regen. | Heat. | Cool. | O | O | C | C | O | C | O | C | O | O | C | C | C | O |
| Ads. | NF | Regen. | NF | Cool. | O | O | C | C | O | C | C | O | C | O | O | C | C | O |
| Disp. | Ads. | Disp. | Disp. | Disp. | C | C | O | C | C | O | O | C | O | C | O | C | C | O |
| Regen. | Ads. | Cool. | Cool. | Heat. | C | C | O | C | C | O | C | O | O | C | C | O | O | C |
| Regen. | Ads. | NF | Cool. | NF | C | C | O | C | C | O | C | O | O | C | C | O | O | C |
| Disp. | Disp. | Ads. | Disp. | Disp. | C | C | C | O | O | C | O | C | C | O | O | O | O | C |

*Abbreviations.—C=Valve Closed. O=Valve Open. Ads.=Adsorbing. Disp.=Displacement. NF=No flow through vessel. Regen.=Regeneration. Cool.=Cooling. Heat.=Heating.

The preceding sequence of process steps completes an adsorbing, heating and cooling cycle for each of the adsorbent vessels. The compensators, however, have completed more than one cycle and the relative positions of these vessels have been reversed in the flow stream. Two complete cycles of the adsorbent beds return the flow pattern to the starting position indicated. Valves Nos. 4 and 11 have been shown to indicate alternate methods of rich gas displacement, or purge. Both of these valves can be eliminated if only the residue gas is used for this purpose.

In the preceding example, the flow path during the displacement phase follows the sequence in which rich gas from the hot regenerated bed 5 is displaced into the cold compensator 20 and thence into the heating system. Correspondingly rich gas from the regeneration system is displaced into the cold spent bed 6 about to be regenerated, the cooling and separating system (14, 15 and 16), the gas booster and the hot compensator 21. Optionally the cooling and separating system can be bypassed.

This flow path during the displacement phase in FIGURE 1 can be modified if desired by switching the condenser, separator and compressor downstream of the hot regenerated bed and upstream of the cold compensator. Thus in the example previously discussed during the displacement or purge phase, the rich gas in adsorber 5 can be displaced through coolers 14 and 15, scrubber 16, compensator 20 and into adsorber 6. Rich gas present in compensator 20 will be displaced ahead of the rich gas from adsorber 5 to compensator 21. A valve program for this flow plan is shown in Table II.

condenser and separator may be bypassed utilizing valves 23 and 24.

To provide an example, assume that adsorber 5 has completed regeneration, adsorber 6 has completed the adsorption phase and adsorber 4 has been cooled. Further, compensator 20 has been in the regeneration phase and compensator 21 in the cooling phase where it has become heated. In the subsequent displacement phase raw or residue gas admitted to adsorber 5 displaces the rich gas in adsorber 5 and in compensator 20 directly to compensator 21, heater 23 and adsorber 6. The gas displaced from ad-

TABLE II.—PROCESS VESSEL AND VALVE SEQUENCE

| Adsorbent Vessels | | | Compensators | | Valves* | | | | | | | | | | | | | |
|---|---|---|---|---|---|---|---|---|---|---|---|---|---|---|---|---|---|---|
| No. 4 | No. 5 | No. 6 | No. 20 | No. 21 | V-1 | V-2 | V-3 | V-5 | V-6 | V-7 | V-8 | V-9 | V-10 | V-12 | V-13 | V-14 | V-15 | V-16 |
| Cool. | Regen. | Ads. | Cool. | Heat. | C | C | O | C | O | C | O | C | C | O | C | C | C | O |
| NF | Regen. | Ads. | Cool. | NF | C | C | O | O | O | C | C | C | C | O | C | C | C | O |
| Ads. | Disp. | Disp. | Disp. | Disp. | O | C | C | C | C | O | C | O | C | C | C | O | C | O |
| Ads. | Cool. | Regen. | Heat. | Cool. | O | C | C | O | C | O | C | O | C | C | O | C | C | C |
| Ads. | NF | Regen. | NF | Cool. | O | C | C | C | C | O | C | C | C | C | O | C | C | C |
| Disp. | Ads. | Disp. | Disp. | Disp. | C | O | C | O | C | C | C | C | O | C | C | C | C | C |
| Regen. | Ads. | Cool. | Cool. | Heat. | C | O | C | O | C | C | C | C | O | C | C | O | O | C |
| Regen. | Ads. | NF | Cool. | NF | C | O | C | O | C | C | C | C | O | C | C | O | O | C |
| Disp. | Disp. | Ads. | Disp. | Disp. | C | C | O | C | O | C | O | C | C | C | O | C | O | C |

| Adsorbent Vessels | | | Compensators | | Valves* | | | | | | | | | | | | | |
|---|---|---|---|---|---|---|---|---|---|---|---|---|---|---|---|---|---|---|
| No. 4 | No. 5 | No. 6 | No. 20 | No. 21 | V-17 | V-18 | V-19 | V-20 | V-21 | V-22 | V-23 | V-24 | V-25 | V-26 | V-27 | V-28 | V-29 | V-30 |
| Cool. | Regen. | Ads. | Cool. | Heat. | C | C | C | O | C | O | C | O | O | C | C | O | O | C |
| NF | Regen. | Ads. | Cool. | NF | C | C | C | O | C | O | C | O | O | C | C | O | O | C |
| Ads. | Disp. | Disp. | Disp. | Disp. | C | O | C | C | C | O | C | O | O | C | C | O | O | C |
| Ads. | Cool. | Regen. | Heat. | Cool. | O | O | C | C | O | C | C | O | O | C | C | O | C | O |
| Ads. | NF | Regen. | NF | Cool. | O | O | C | C | O | C | C | O | O | C | C | C | C | O |
| Disp. | Ads. | Disp. | Disp. | Disp. | O | C | O | C | O | C | C | O | O | C | C | O | O | O |
| Regen. | Ads. | Cool. | Cool. | Heat. | C | C | O | C | C | O | C | O | O | C | C | O | O | C |
| Regen. | Ads. | NF | Cool. | NF | C | C | O | C | C | O | C | O | O | C | C | O | O | C |
| Disp. | Disp. | Ads. | Disp. | Disp. | C | C | C | O | C | O | C | O | O | C | C | O | O | C |

*Abbreviations.—C=Valve Closed. O=Valve Open. Ads.=Adsorbing. Disp.=Displacement. NF=No flow through vessel. Regen.=Regeneration. Cool.=Cooling. Heat.=Heating.

The piping system can further be modified to enhance heat storage and withdrawal from the compensators. Experience has shown that hot gases which heat the compensators and are in turn cooled should be injected at one end (for example, the top, if the compensators are placed vertically) and that gases which cool the compensators and are in turn heated should be injected at the other end (the bottom, if the compensators are placed vertically). This practice promotes stabilized heat transfer and reduces eddies and turbulence of fluid passing through the compensator. This modification in the heat storage and withdrawal system can be applied to either of the flow paths discussed in association with FIGURE 1, and is specifically incorporated in the flow scheme presented in FIGURES 2 and 3.

Figure 2:
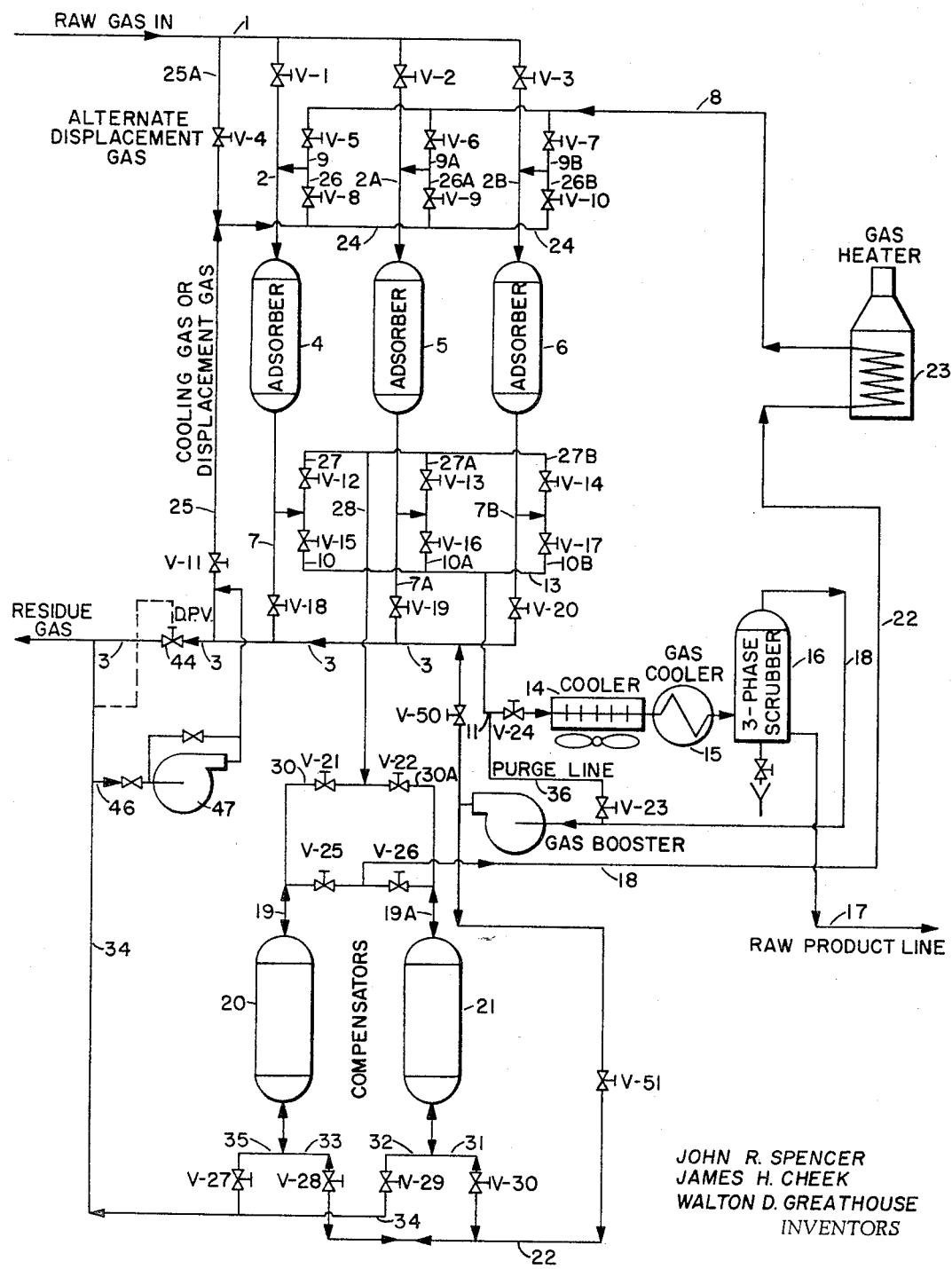
FIGURE 2 is a schematic drawing of another embodiment of this invention in which two-way valves are used.

FIGURE 2 represents another embodiment of our invention. In this embodiment, a flow sequence identical to that for FIGURE 1 is followed for the adsorption, regeneration and cooling phases of the cycle. During this portion of the cycle, valve 50 is closed and valve 51 is open. During the subsequent displacement phase, however, valve 51 is closed and valve 50 opened. A portion of the residue gas is utilized to displace gas in the hot, regenerated bed and the cold compensator in the regeneration system to the hot compensator, the heating system and into the cold bed about to be regenerated displacing gas contained in the cold bed through the condenser and separator and thence from the system. Optionally, the sorber 6 flows through coolers 14 and 15, scrubber 16 and from the system or alternatively is bypassed directly from the system.

Figure 3:
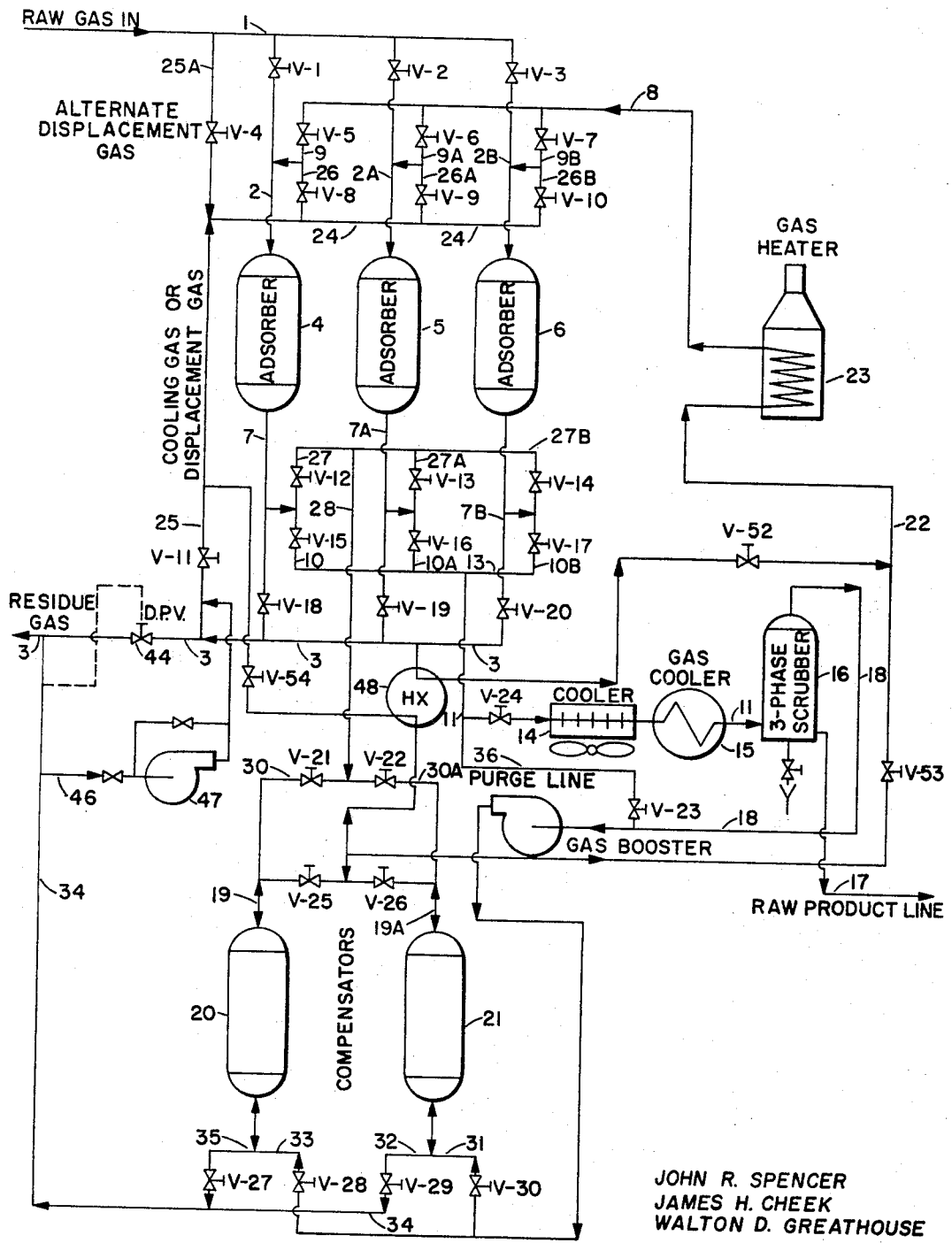
FIGURE 3 is a schematic drawing of another embodiment of this invention in which two-way valves are used and a heat exchanger is incorporated.

FIGURE 3 illustrates still another embodiment of our invention. In this embodiment, heating of the bed being regenerated is completed during the displacement phase of the cycle. The flow sequence in FIGURE 3 is similar to FIGURE 1 except that valves 52, 53 and 54, have been incorporated into a slightly modified system of piping and a heat exchanger 48 has been added. Valve 11 is also necessary in this system. Again this embodiment utilizes the concept that heat transfer is more efficient if hot gas is withdrawn and injected at one end of a compensator and similarly cold gas injected and withdrawn at the other end.

In this embodiment at the beginning of the purge or displacement phase of the cycle a previously cooled adsorber is placed in adsorption service. A portion of the residue gas from this bed is passed through heat exchanger 48 and thence to gas heater 23. This heated residue gas is then passed to a bed which is just finishing the regeneration phase. The incoming heated residue gas completes heating the regenerating bed and displaces rich gas contained therein through a condenser and separator, and further displaces the rich gas contained in the compensator just finishing cooling, to the heat exchanger 48. Simultaneously lean gas from the bed just removed from adsorption service and the hot compensator connected downstream of this latter bed are displaced from the system.

For example, assume that adsorber 5 has almost completed regeneration, adsorber 6 is in the final stage of adsorption, and adsorber 4 has completed cooling. Further, compensator 20 has been in the regeneration phase and compensator 21 in the cooling phase where it has become heated. At this time, appropriate valves are switched so that adsorber 4 is placed in service and in the subsequent displacement phase a portion of the residue gas leaving adsorber bed 4 is passed through heat exchanger 48 and to heater 23 to adsorber bed 5, coolers 14 and 15, separator 16 and compensator 20. The passing of this heated gas through bed 5 completes the regeneration of bed 5 and simultaneously the hot rich gas in bed 5 is displaced through coolers 14 and 15, separator 16 and compensator 20 through exchanger 48 to adsorber bed 6 and compensator 21. Gas previously present in bed 6 and compensator 21 is displaced from the system.

At the completion of each of the displacement or purging phases discussed, the system is then switched by appropriate valves to the simultaneous adsorption, regeneration and cooling phases.

Figure 4:
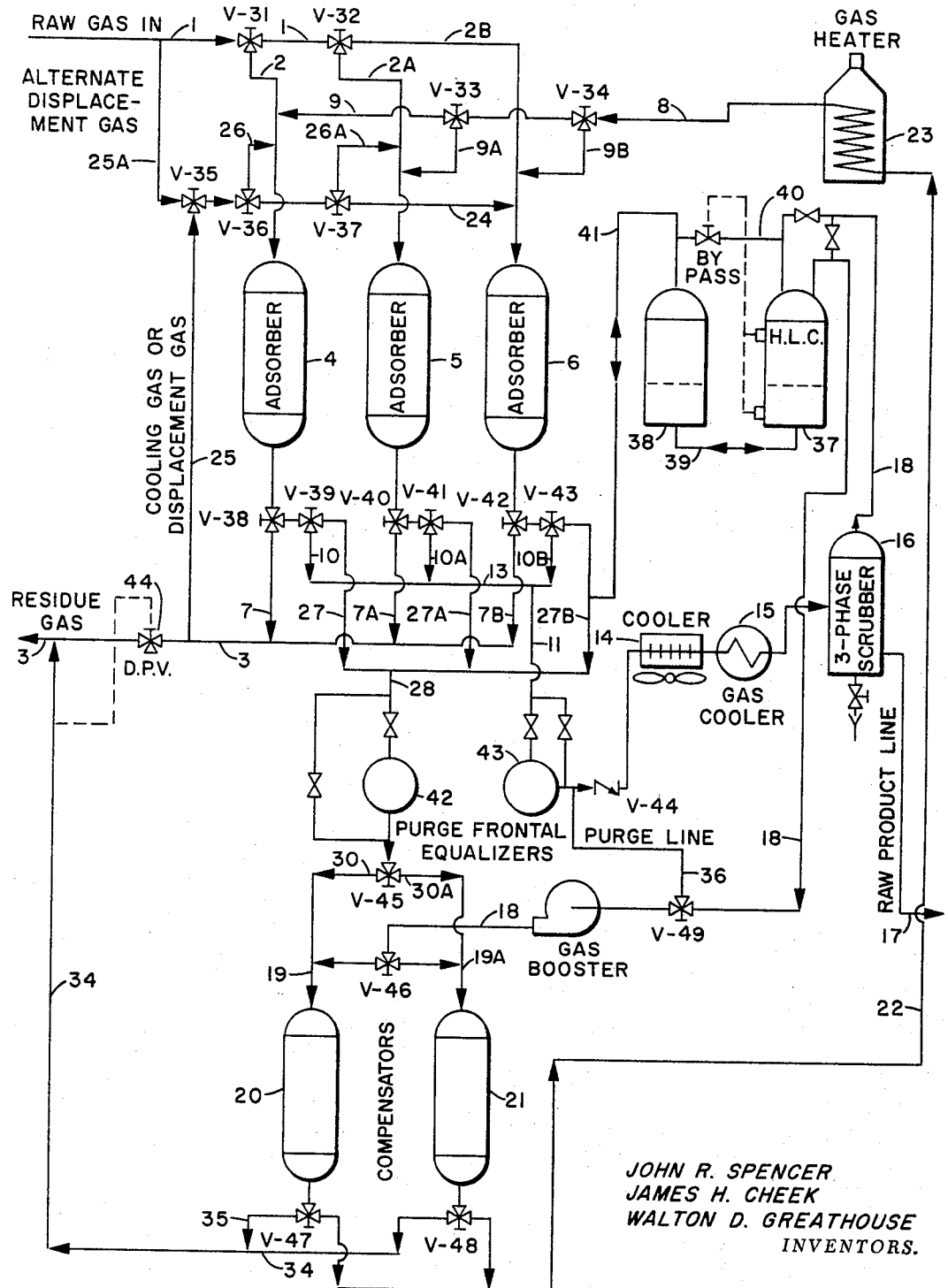
FIGURE 4 is a schematic drawing of another embodiment of this invention in which three-way valves are used.

The system of FIGURE 4 operates similarly to that described in FIGURE 1, with like or similar numbers indicating like parts. The cycling valves in FIGURE 4 are three-way valves, while those of FIGURE 1 are two-way valves. FIGURE 4 also shows the use of purge front equalizers, or regeneration gas surge vessels. The use of these purge front equalizers will be described after the following discussion of FIGURE 8.

Figure 8:
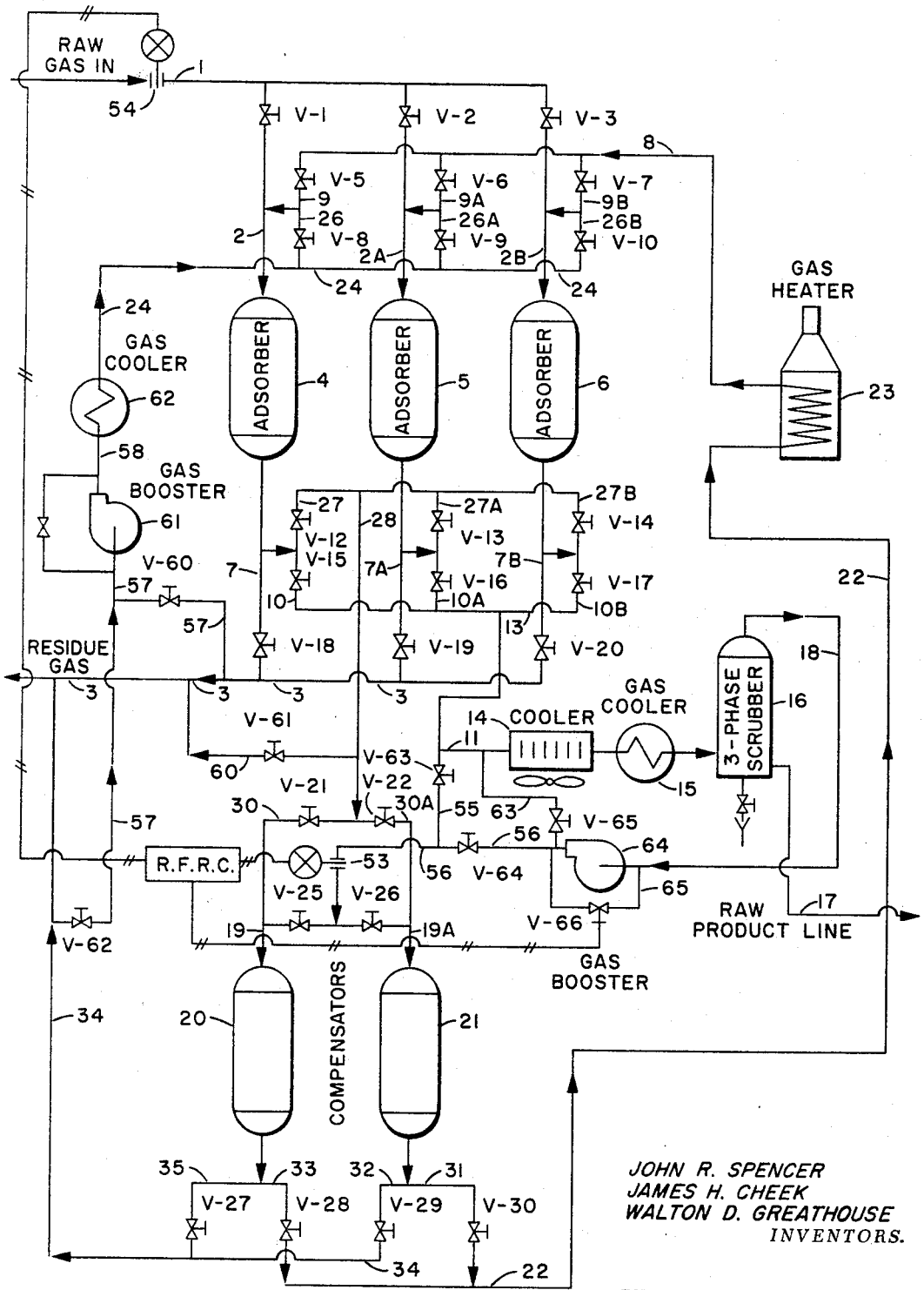
FIGURE 8 is a schematic drawing of yet another embodiment of our invention in which two-way valves are used.

FIGURE 8 illustrates another embodiment of our invention. In this embodiment some of the flow sequence and much of the equipment placement is similar to that of FIGURE 1. In FIGURE 8 embodiment, however, a gas cooler 62 has been inserted by means of conduits 58 and 24 into the flow path of the cooling gas stream upstream of the adsorbent bed being cooled. The function of blower or gas booster 61 in FIGURE 8 is similar to the combined functions of differential pressure valve 44 and gas booster 47 in FIGURE 1. Valved conduit 57 connects gas booster 61 and conduit 3. The bypass conduit 36 of FIGURE 1 has been replaced by valved conduit 55, which connects conduit 11 on the upstream side of the cooler 14, valved conduit 56 on the downstream side of the valve 64 and conduit 13 as shown. Conduit 63 interrupted by valve 65 has been added to connect conduit 11 on the upstream side of cooler 14 and to connect conduit 56 at a point downstream of gas booster 64. Valve 64 has been inserted in conduit 56 downstream of gas booster 64 and upstream of the intersection of conduit 55 with conduit 56. Conduit 60 interrupted by valve 61 has been added to connect conduit 28 and conduit 3 as shown in FIGURE 8. Conduit 57 interrupted by valve 62 has been added to connect conduit 34 and gas booster 61 as shown. Differential pressure valve 44 of FIGURE 1 has been removed from conduit 3. The use of conduit 63 and valve 65 and the use of valve 62 are optional, depending upon the flow path desired in the system, as will be discussed more fully later. The embodiment in FIGURE 8 makes it possible to: (1) recirculate by means of conduit 57 at least some of the gas in the cooling phase to provide a cooler gas for the purpose of cooling the heated adsorbent bed and to reclaim any remaining condensables released by the heated adsorbent bed during this first part of the cooling phase; (2) bypass by means of conduit 60 the heated compensator during the displacement phase if such is desirable; (3) bypass the volume compensator in the cooling phase near the end of the phase to prevent loss of heat from the volume compensator to the cool gas stream flowing through it; and (4) bypass more effectively the coolers 14 and 15, scrubber 16 and booster 64 during the displacement phase.

The sequence of steps in the adsorption and regenerating phases are the same as described for FIGURE 1. Raw gas in the sorption phase will flow from conduit 1 through one of the adsorbent beds and residue gas will exit from that bed into the residue gas line 3. Valves 63 and 65 will be closed; valve 64 will be open so that heated gas in the regenerating phase will flow from heater 23 through conduit 8 through the appropriate adsorber and thence to conduit 11, through coolers 14 and 15, scrubber 16, gas booster 64, through either valve 25 or 26 to the appropriate compensator and thence through conduit 22 to the heater.

The sequence of substeps in the cooling phase in the embodiment in FIGURE 8 comprises: (1) a semiclosed circuit cooling step in which at least part of the cooling gas flowing in conduit 34 is recycled back into the cooling circuit; (2) an open circuit cooling step in which valve 62 is closed and all of the gas flowing in conduit 34 is returned to the residue gas line 3; and (3) a step in which the volume compensator in the cooling gas circuit is isolated from the circuit by diverting the flow of gas effluent from the adsorber in the cooling circuit directly to the residue gas line either through conduit 60 or by opening either valves 18, 19, or 20 as may be appropriate.

Use in substep (1) of semiclosed-circuit cooling permits any residual desired condensables remaining in the hot bed to be carried back into the cooling circuit and deposited into the upper initially cooled part of the bed. The amount of condensables thus claimed will be minor but does improve the efficiency of recovery, by preventing loss of these condensables to the residue gas line. It is necessary, however, to discontinue substep (1) and change to substep (2) of open circuit cooling in time to prevent carrying back into the system a range of extremely heavy molecular weight hydrocarbons. This latter material derives from lubricants in the compressors and other equipment in the system. If it is carried back into the system repetitively it will accumulate in the sorbent beds and seriously impair their absorbent capacity. This material, by being discharged into the open circuit flow, is vented to the residue gas line and carried from the system.

It is in the displacement phase that a number of variations of flow path are available. In one variation, both valve 63 and bypass conduit 63 with valve 65 are utilized. In this variation, displacing gas in drawn from conduit 3 through conduit 57 and open valve 60, booster 61, cooler 62, and conduit 24. The gas then flows through the hot adsorber to conduit 13, conduit 55, conduit 56 (valve 64 is closed) to one of the compensators. The gas in the hot adsorber and compensator is displaced through conduit 22, heater 23, conduit 8, the spent adsorber to be regenerated, conduit 27, 27A or 27B as appropriate, conduit 28, conduit 30 or 30A, the other compensator and then through conduit 32 or 35 and conduit 34 to the residue gas line 3. During this displacement, valve 65 in conduit 63 is open but valve 64 is closed so that the coolers 14 and 15, scrubber 16 and booster 64 form a separate circuit and gas can recycle through conduit 63. If bypass conduit 63 and valve 65 are not included in the apparatus the RFRC valve 66 can be overridden to remain open and allow gas to bypass around booster 64.

To provide an example, assume that adsorber 5 has completed regeneration, adsorber 6 has completed the adsorption phase, and adsorber 4 has been cooled. Further, compensator 20 has been in the regeneration phase and is now cool; compensator 21 has been in the cooling phase and has become heated. The valves of the system are opened and closed so that, in the displacement phase, raw gas now flows through conduit 2 into adsorber 4, wherein the condensables are adsorbed and the residue gas is vented through conduit 7. A portion of the residue gas is diverted from conduit 3 through conduit 57, valve 60, booster 61, conduit 58, gas cooler 62, conduit 24, valve 9, conduit 26A, conduit 2A, into adsorber 5. The gas in adsorber 5 is displaced through valve 16, conduit 10A, conduits 13, 55, and 56, valve 25, conduit 19, compensator 20, conduit 33, valve 28, conduit 22, heater 23, conduit 8, valve 7, conduits 9B, 2B, and into adsorber 6. The gas in adsorber 6, a lean gas, is displaced through valve 14, conduits 27B and 28, valve 22, conduit 19A, compensator 21, conduit 32, valve 29, conduit 34 and residue gas line 3. During the displacement phase the gas coolers 14 and 15, scrubber 16 and the booster 64 have been cycling as a separate circuit by closing valve 64 and opening valve 65.

At the end of the displacement or purge step, the flow paths are changed so that adsorber 6 is in a closed heating phase and adsorber 4 remains in an adsorption phase. The first substep of the cooling phase of adsorber 5 is semiclosed. To continue the preceding example, valves 60, 14, 16, 22 and 28 would be closed and valves 13, 21, 27 and 62 opened. This enables circulation of cooling gas through booster 61, cooler 62, adsorber 5, conduits 27A, conduit 28, valve 21, compensator 20, valve 27, conduit 34, valve 62, conduit 57, and back to booster 61. The section of conduit 34 connecting conduit 3 and conduit 57 is open so that the decrease in gas volume in the cooling phase caused by cooling is compensated by residue gas flowing from conduit 3 through conduit 34 through valve 62. It should be noted that valve 62 is optional and can be eliminated, if it is permissible, to relax some control over the source of the cooling gas used.

When cooling has progressed sufficiently, the recycling of cool gas in the cooling phase is discontinued and the cooling phase is converted to an open circuit cooling. Residue gas in the open circuit flows through the cooler, adsorber, compensator, and returns to the residue gas line. In this example, valve 62 would be closed and valve 60 opened. In the final phase of cooling, the compensator downstream of the adsorber being cooled is isolated to prevent loss of heat from the compensator into the cool gas stream flowing therethrough. In the preceding example, valve 21 would be closed and either valve 19 in conduit 7A or valve 61 in conduit 60 opened.

During these steps of the cooling phase, each of the other adsorbers has continued with its adsorption or heating phase. A valve scheme for this variation of the embodiment depicted in FIGURE 8 is presented in Table III. If the inclusion of valve 62 is not desired, then conduit 57 remains open continually and the valve settings in Table III for valve 62 can be ignored.

Another variation of the displacement phase is possible between the points where gas flows from the hot adsorber and into the cold compensator and between the points where gas flows from the spent adsorber to be regenerated into the compensator to be placed in the heating phase. This variation constitutes reversing the flows in conduits 28 and 55.

For example, the displacement gas leaving adsorber 5 in the preceding illustration is flowed through conduit 27A, valve 13, and conduit 28 to valve 21. Correspondingly, gas leaving adsorber 6 is displaced now through conduit 10B, valve 17, conduits 13 and 55 through valve 63 to valve 26. Table IV presents those valve settings from Table III which can be modified and followed to obtain this flow path. This flow scheme can be further modified to bypass the hot compensator during the displacement phase by closing both valves 15, 16, or 17 as appropriate and diverting the flow from the spent adsorber through the valve (18, 19, or 20) connecting to the residue gas line 3. In the preceding example, valve 17 would be closed and valve 20 opened. The valve sequence in Table IV can be modified by diverting flow through conduit 60. This step of bypassing the hot compensator will be desirable only when the cold bed about to be regenerated retains sufficient absorptive capacity to adsorb the condensables from that portion of the rich regeneration displaced through it. Otherwise, loss of condensables to the residue gas line can result.

TABLE III.—PROCESS VESSEL AND VALVE SEQUENCE
[Method and apparatus of Figure 8]

Abbreviations.—C = Valve Closed. O = Valve Open. Ads. = Adsorbing. Disp. = Displacement. NF = No flow through vessel. Regen. = Regeneration. Cool. = Cooling. Heat. = Heating.

TABLE IV.—MODIFIED PROCESS VESSEL AND VALVE SEQUENCE

[Method and apparatus of Figure 8]

| Adsorbent Vessels | | | Compensators | | Valves | | | | | | | | | |
|---|---|---|---|---|---|---|---|---|---|---|---|---|---|---|
| No. 4 | No. 5 | No. 6 | No. 20 | No. 21 | V-12 | V-13 | V-14 | V-15 | V-16 | V-17 | V-21 | V-22 | V-25 | V-26 |
| Cool. | Regen. | Ads. | Cool. | Heat. | O | C | C | C | O | C | C | O | O | C |
| Cool. | Regen. | Ads. | Cool. | NF | O | C | C | C | O | C | C | C | O | O |
| Ads. | Disp. | Disp. | Disp. | Disp. | C | O | C | C | C | O | O | C | C | O |
| Ads. | Cool. | Regen. | Heat. | Cool. | C | O | C | C | C | O | O | C | C | O |
| Ads. | Cool. | Regen. | Heat. | Cool. | C | O | C | C | C | O | O | C | C | O |
| Ads. | Cool. | Regen. | NF | Cool. | C | O | C | C | C | O | C | C | O | O |
| Disp. | Ads. | Disp. | Disp. | Disp. | C | C | O | O | C | C | C | O | O | C |
| Regen. | Ads. | Cool. | Cool. | Heat. | C | C | O | O | C | C | C | O | O | C |
| Regen. | Ads. | Cool. | Cool. | Heat. | C | C | O | O | C | C | C | O | O | C |
| Regen. | Ads. | Cool. | Cool. | NF | C | C | O | O | C | C | C | C | O | C |
| Disp. | Disp. | Ads. | Disp. | Disp. | O | C | C | C | O | C | O | C | C | O |
| Cool. | Regen. | Ads. | Heat. | Cool. | O | C | C | C | O | C | O | C | C | O |
| Cool. | Regen. | Ads. | Heat. | Cool. | O | C | C | C | O | C | C | C | C | O |
| Cool. | Regen. | Ads. | NF | Cool. | O | C | C | C | O | C | C | C | C | O |
| Ads. | Disp. | Disp. | Disp. | Disp. | C | O | C | C | C | O | C | O | O | C |
| Ads. | Cool. | Regen. | Cool. | Heat. | C | O | C | C | C | O | C | O | O | C |
| Ads. | Cool. | Regen. | Cool. | Heat. | C | O | C | C | C | O | C | O | O | C |
| Ads. | Cool. | Regen. | Cool. | NF | C | O | C | C | C | O | C | O | O | C |
| Disp. | Ads. | Disp. | Disp. | Disp. | C | C | O | O | C | C | C | O | C | O |
| Regen. | Ads. | Cool. | Heat. | Cool. | C | C | O | O | C | C | O | C | C | O |
| Regen. | Ads. | Cool. | Heat. | Cool. | C | C | O | O | C | C | O | C | C | O |
| Regen. | Ads. | Cool. | NF | Cool. | C | C | O | O | C | C | O | C | O | C |
| Disp. | Disp. | Ads. | Disp. | Disp. | O | C | C | C | O | C | C | O | O | C |
| Cool. | Regen. | Ads. | Cool. | Heat. | O | C | C | C | O | C | C | O | O | C |

Abbreviations.—C=Valve Closed. O=Valve Open. Ads.=Adsorbing. Disp.=Displacement. NF=No flow through vessel. Regen.=Regeneration. Cool.=Cooling. Heat.=Heating.

The switching of valves in the embodiment in FIGURE 8 can be made responsive to temperature measurements and timing mechanisms. The displacement phase can be started by a signal from a temperature sensing element in the gas flow from the adsorber being heated and at the same time a cooled adsorber placed in the adsorption phase. The duration of the displacement phase can be controlled by a timer which, at the end of the displacement phase, manipulates the valves and switches the appropriate adsorbers into the respective phases of heating and semiclosed-circuit cooling. A second timer can then convert the adsorber in the semiclosed-circuit cooling phase to an open circuit cooling phase. A temperature sensing element in the flow stream from the compensator in the cooling phase can then activate the valves necessary to isolate the compensator from the flow stream and to switch flow from the adsorber being cooled directly to the residue gas line.

Figure 5:
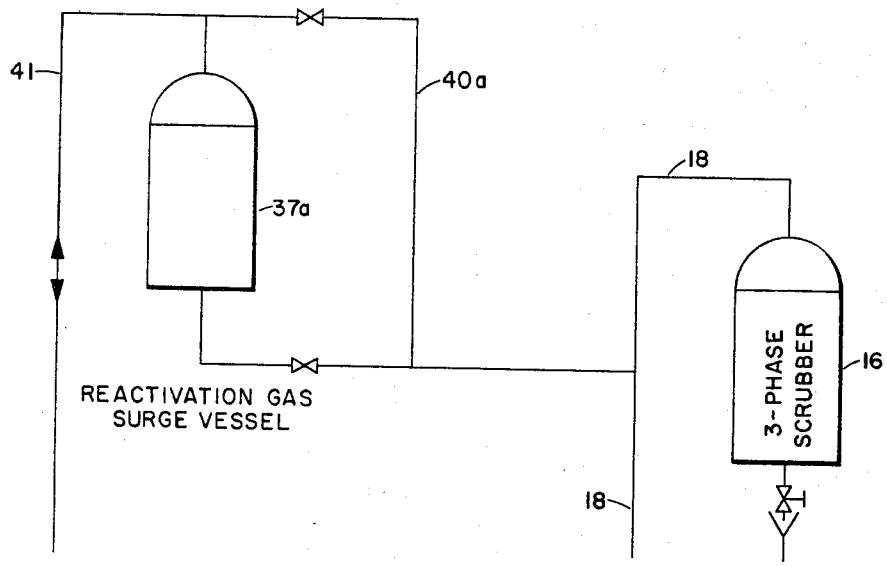
FIGURE 5 is a schematic drawing of an embodiment of this invention suitable for use in the systems of FIGURES 1–4.
Figure 6:
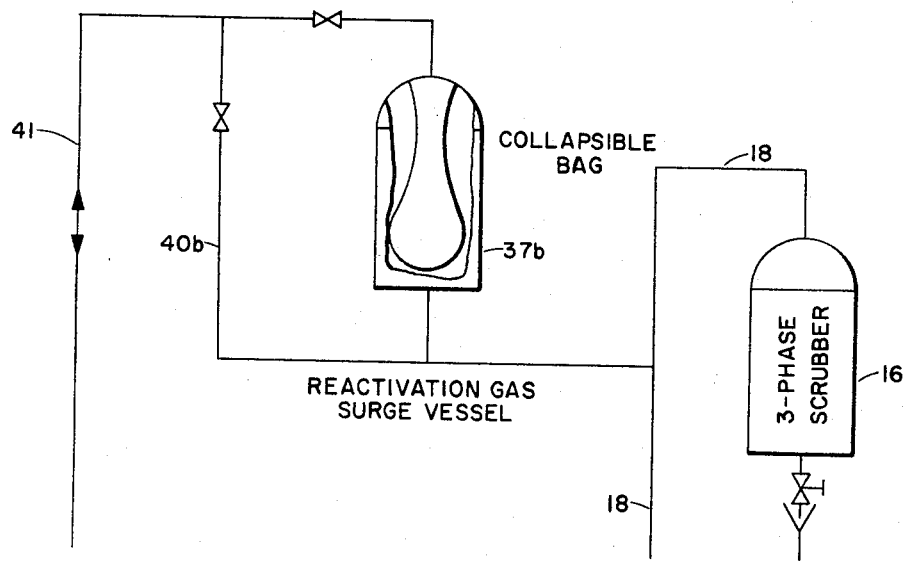
FIGURE 6 is a schematic drawing of yet another embodiment of our invention, which is again suitable for use in the systems of FIGURES 1–4.

The condensation of liquids from the regeneration gas is dependent upon the composition, pressure and temperature of the gas as it passes through the cooling section. The system can be designed so that the variation in the pressure and temperature in the cooling section will be of a low order of magnitude during a regeneration step. The composition of the gas varies as the regeneration proceeds. For example, some of the low molecular weight, more volatile components are evolved early in the regeneration phase, while the heavier components evolve during the last phase of the regeneration. This behavior results in the condensation of gas to liquids being less than the volume of gas evolved during the first portion of the regeneration. An increase in the total circulating gas volume results. The heavy components evolved during the last portion of the regeneration are more favorable to condensation. This results in the condensation of more gas than is evloved from the bed and reduces the total circulating gas volume. Volume compensation for this behavior can be included in the system by using a regeneration-gas-surge-vessel as shown in FIGURES 4, 5 and 6. The vessels shown as items 37 and 38 are similar to a gasometer. A liquid of low volatility is displaced from one side of the vessel to the other by way of conduit 39 by a small pressure differential to allow for gas expansion or contraction in the closed system. Limit controls prevent the liquid from being blown from the vessel.

Alternate system of FIGURE 5 embodies a system that allows heavy vapors from the regeneration stream to enter the bottom of the vessel displacing light gas from the top of the vessel during increases in gas volume during regeneration. The reverse flow occurs when the regeneration gas volume shrinks. In this case the gases remain separated only by the difference in gravities. Slight diffusion mixing results, but this mixing can be reduced to almost nil by packing the vessel with very porous and permeable material to reduce convection and turbulence. Alternate system of FIGURE 6 indicates another method of providing an expansion chamber with separation of the lean and rich gases by means of a collapsible, impermeable bag. All of the above schemes tend to equalize the pressure of the regeneration gas with some point in the process system. Provision has been made to isolate this vessel and the cooling and scrubber during the rich gas displacement step.

The heat capacities per unit of void volume and the effective total porosities of each of the adsorbent beds and vessels and of each of the regenerative heat exchangers should be as nearly equal as is practical for effective use of this invention.

The size and number of the adsorbent towers and the type and quantity of adsorbent to be used in the towers are somewhat dictated by the process conditions. With these factors established, the void volume of the compensators can be matched to the adsorbent beds by packing the compensators with a porous and permeable material of very low adsorptive capacity. This material must be stable under the operating conditions, such as exposure to hydrocarbons under pressure and possibly water, and temperatures ranging from ambient to 700 deg. F. Suitable materials include metal turnings or shapes, glass fibers, glass spheres, crushed glass, crushed or blown slag, quartz, certain volcanic rock, and ceramics.

The permeability of the compensators should be high for the practical purpose of reducing the pressure drop across the unit. The particle or fiber size of the packing material should be such that the heat capacity of the bed can be efficiently utilized for heat storage and transfer. Particle sizes in the range of 6 to 14 mesh and fibers or turnings of less than 1/8-inch thickness are considered desirable. It is sometimes necessary to mix two or more materials to obtain the optimum porosity, permeability, bulk density and heat capacity.

Following is an example using silica gel as an adsorbent and steel turnings or wire in the regenerative heat exchangers:

Silica gel properties:
  Density of silica _____ lbs./cu. ft__ 137
  Bulk density _____ lbs./cu. ft__ 45
  Mean specific _____ heat, B.t.u./lb./° F__ 0.22
Steel properties:
  Mean specific heat _____ B.t.u./lb./° F__ 0.13
  Density _____ lbs./cu. ft__ 484

Pounds steel turnings in regenerative bed per cubic foot of silica gel bed $=\frac{45 \times 0.22}{0.13}=76.2$ Actual volume of steel per cubic foot of gel $=\frac{76.2}{484}$ $=0.157$ cu. ft.

Porosity of silica gel bed $=\frac{137-45}{137}=0.672$ cu. ft./cu. ft.

Volume of regenerative bed required $=0.157+0.672$ $=0.829$ cubic feet per cubic foot of silica gel bed.

This example can be further refined by using more precise specific heats, accounting for the heat exchanged or lost from the vessel walls and piping, and by using empirical data on the displacement heat transfer efficiencies through the two vessels. The heat capacity of each compensator should be sufficient to contain within the compensator movement of the heat zones during the purge phase.

The construction of the compensators of this type can be still further improved if the zonal transfer of heat between the sorbent beds and the compensators is considered as well as the mechanism of the stripping of condensables from the bed. As the sorbent bed begins to heat, the lighter, more volatile condensables vaporize first and gas volume increases at a more rapid rate than later when the heavier, less volatile components vaporize. Thus, to maintain a constant pressure in the system, more volume compensation is needed at the beginning of the regeneration cycle than at the end. The cooling of the material in the compensator downstream occurs as a zonal front advancing downstream. At the beginning of a regeneration phase only the upstream portion of the compensator will have cooled appreciably. Therefore, the upstream portion of the compensator must compensate more volumetrically than the downstream portion. This can be accomplished by constructing a compensator whose void volume decreases and whose heat capacity per unit volume of void space increases, each in the direction of flow through the compensator. Thus, as compared with the compensators previously discussed, the improved compensator would have a lower than average heat capacity per unit volume in the upper portion and a higher than average heat capacity per unit volume in the lower portion.

Figure 7:
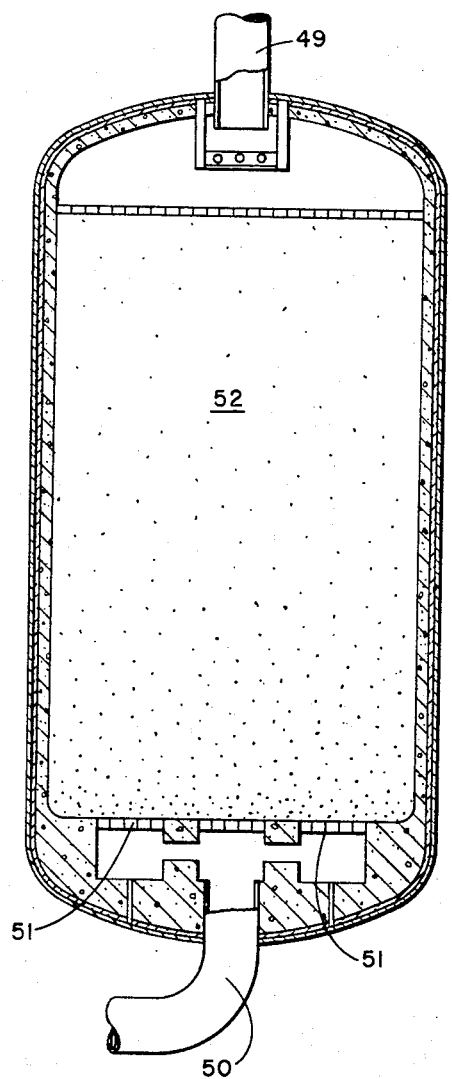
FIGURE 7 is a schematic drawing of another embodiment of this invention which is suitable for use in the systems of FIGURES 1–4.

FIGURE 7 presents schematically a compensator constructed in the manner just discussed. A shell of uniform cross-section has gas inlet and outlet connections 49 and 50. Retainer grids 51 retain a heat regenerative material 52 which has a decreasing void volume and increasing heat capacity in the direction of the flow stream of gas through it during a regeneration phase.

In the design of the adsorber and compensator vessels, it will, of course, be advisable to provide suitable insulation around the vessels, preferably on the interior of the vessel shell.

In FIGURE 1 a flow rate controller is shown regulating the flow of gas in the regeneration phase at 53 in proportion to the flow of incoming raw gas at 54. This is an advantageous arrangement for any of the systems described herein in that it can make the complete recovery system self responsive to the flow rate of the incoming raw gas. Variations in the incoming raw gas stream flow rate cause the flow rate in the regeneration system to vary in direct proportion. Other control elements can be tied into the regeneration system so that the entire recovery system can be keyed to the rate of raw gas flow into the system.

Conduit 46 and blower 47 and its associated bypass shown in FIGURES 1, 2 and 3 are useful when additional cooling gas is required. This situation can occur when the raw gas being processed is so rich that the volume of residue gas flowing from the adsorbing bed will not be sufficient by itself to adequately cool the adsorber bed in the time cycle. Additional cooling gas to make up this deficiency can be obtained from the gas flowing in conduit 34 by means of blower 47 and conduit 46.

The following example will serve to further illustrate our invention.

EXAMPLE I

Raw natural gas feed is processed by a system as shown in FIGURE 1. Adsorbers 4, 5 and 6 each spend about 20 minutes on reactivation, and a little less than 20 minutes being cooled plus a brief shut-in period for a 1-hour cycle time. The cycle is switched from one phase to the next responsive to measurement of the exit gas temperature of the adsorber being regenerated reaching 475° F. Feed gas in conduit 1 is at about 85° F. and 540 p.s.i.a. in an amount of about 6,984 M c.f./day. Adsorber vessels 4, 5 and 6 each have a volume of 332 ft.³, and operate at a pressure of about 535–540 p.s.i.a. Each adsorber contains about 8,220 lbs. of activated carbon (8–14 mesh) and about 1,100 lbs. of silica gel. Adsorbent temperature is about 105° F. during adsorption, a maximum of about 600° F. and an average of about 570° F. during regeneration, and is cooled to about 100° F. during the cooling phase. Residue gas in an amount of about 6,266 M c.f./day at about 100–105° F. and 535 p.s.i.a. is produced by way of conduit 3. Regeneration gas is circulated in conduit 8 in an amount of about 7,100 M c.f./day at about 620° F. and 535 p.s.i.a. Gas in conduit 11, exit coolers 14 and 15, has a temperature of about 100° F. Scrubber 16 operates at about 100° F. and 530 p.s.i.a. Raw liquid product is removed by way of conduit 17 in an amount of about 19,710 gal./day. Cool gas to the compensators is passed by way of conduit 18 at about 7,100 M c.f./day at 544 p.s.i.a. and 100° F. Volume compensators 20 and 21 each have a volume of 332 ft.³, and each contains about 22,063 lbs. of steel turnings, packed as a sponge so as to occupy about 300 ft.³. Heater 23 is designed for a duty of 6 million B.t.u./hr. Cooling gas is passed by way of conduit 25 in an amount of about 9,500 M c.f./day, and is at about 100° F. and 536 p.s.i.a. Hot gas is passed to the compensators by way of conduit 28 in an amount of about 9,500 M c.f./day, and is at about 550° F. and 530 p.s.i.a. Cooled gas exits to residue conduit 3 by way of conduit 34 at about 100° F. and 527 p.s.i.a. The system is further provided with surge vessels 37 and 38, and purge front equalizers 42 and 43, as shown in FIGURE 4. The surge vessels have a net volume of 125 ft.³, and range in temperature from ambient to about 100° F., at about 530 p.s.i.a. The purge front equalizers each have a volume of 8 cubic feet. Average compositions at various points throughout the system are tabulated below:

| Conduit | Nitrogen | Methane | Ethane | Propane | Butanes | Pentanes | Hexanes Plus |
|---|---|---|---|---|---|---|---|
| 1 | 8.02 | 67.90 | 11.03 | 8.75 | 3.42 | 0.69 | 0.19 |
| 3 | 8.92 | 73.59 | 11.23 | 6.26 | | | |
| 8 | 4.35 | 52.84 | 16.73 | 18.42 | 6.55 | 1.04 | 0.07 |
| 17 | | 11.17 | 8.63 | 30.46 | 38.12 | 8.73 | 2.89 |

EXAMPLE II

Raw natural gas is processed as in Example I under the following conditions:

| | |
|---|---|
| Feed gas temperature, conduit 1 | 85° F. |
| Feed gas pressure, conduit 1 | 1,000 p.s.i.a. |
| Feed gas flow rate | 30 MM c.f./day. |
| Volume of adsorber vessels | 428 ft.³ |
| Operating pressure, adsorber vessels | 985 to 1,000 p.s.i.a. |
| Weight of activated carbon in each adsorber vessel | 12,000 lbs. (8–14 mesh). |
| Residue gas volume | 29.4 MM c.f./day. |
| Residue gas pressure | 980 p.s.i.a. |
| Regeneration gas volume | 5 MM c.f./day. |
| Regeneration gas temperature | 650° F. |
| Regeneration gas pressure | 1,000 p.s.i.a. |
| Raw liquid product | 19,500 gal./day. |
| Compensator volumes, each | 428 ft.³ |
| Weight of steel turnings in each compensator | 27,000 lbs. |
| Heater design, maximum duty | 5 MM B.t.u./hour. |
| Cooling gas rate | 7 MM c.f./day. |
| Other temperature | Same as in Example I. |

AVERAGE COMPOSITIONS AT VARIOUS POINTS THROUGHOUT SYSTEM

| Conduit | Methane | Ethane | Propane | Butanes | Pentanes Plus |
|---|---|---|---|---|---|
| 1 | 92.42 | 5.18 | 1.73 | 0.47 | 0.20 |
| 8 | 94.31 | 5.24 | .43 | 00.02 | Trace |
| 3 | 68.29 | 12.55 | 15.12 | 2.00 | 2.04 |
| 17 | 21.30 | 15.00 | 45.87 | 12.48 | 5.35 |

EXAMPLE III

Raw natural gas feed is processed by a system as shown in FIGURE 8. Adsorbers 4, 5 and 6 each spend about 18 minutes on adsorption, 18 minutes on reactivation, and 18 minutes being cooled. The cycle is switched from one phase to the next responsive to measurement of the exit gas temperature of the adsorber being regenerated reaching 350° F. In addition, the cooling system is controlled by opening and closing valves V–62 and V–60 by use of timers, and V–61 responsive to measurement of the exit gas temperature in conduit 28. The switch from semiclosed circuit cooling to open circuit cooling is made approximately 12 minutes after start of each cycle. The compensator is removed from the system by closing valve V–21 or V–22 and opening valve V–61 when the gas temperature in conduit 28 measures 200° F. Feed gas in conduit 1 is at about 90° F. and 550 p.s.i.a. in an amount of about 19,800 M c.f./day. Adsorber vessels 4, 5 and 6 each have a volume of 592 ft.³ before bed fill is added, and operate at a pressure of about 545–560 p.s.i.a. Each adsorber contains about 16,300 pounds of activated carbon (8–14 mesh). Adsorbent temperature is about 120° F. during adsorption, a maximum of about 600° F. during regeneration, and is cooled to about 120° F. during the cooling phase. Residue gas in an amount of about 18,800 M c.f./day at about 150–200° F. and 540 p.s.i.a. is removed by way of conduit 3. Regeneration gas is circulated in conduit 8 in an amount of about 15,000 M c.f./day at about 630° F. and 550 p.s.i.a. Gas in conduit 11, exit coolers 14 and 15, has a temperature of about 100° F. Scrubber 16 operates at about 100° F. and 540 p.s.i.a. Raw liquid product is removed by way of conduit 17 in an amount of about 37,000 gal./day. Cool gas to the compensators is passed by way of conduit 18 at about 15,000 M c.f./day at 540 p.s.i.a. and 100° F. Volume compensators 20 and 21 each have a volume of 592 ft.³ before bed fill is added, and each contains about 24,600 pounds of volcanic rock aggregate, packed so as to occupy about 546 ft.³. Heater 23 is designed for a duty of 12 million B.t.u./hr.

During the semiclosed and open circuit cooling steps of the cooling phase, cooling gas is circulated through conduit 24 in an amount of about 22,000 M c.f./day and has an average temperature of 100° F. Hot gas is passed to the compensators by way of conduit 28 in an amount of about 22,000 M c.f./day and is at about 590° F. and 550 p.s.i.a. Cooled gas exits to residue conduit 3 by way of conduit 34 at about 125–200° F. and 543 p.s.i.a. Average compositions at various points throughout the system are tabulated below in mol percent:

| Conduit | Nitrogen | Methane | Ethane | Propane | Butanes | Pentanes | Hexanes Plus |
|---|---|---|---|---|---|---|---|
| 1 | 0.19 | 86.45 | 7.16 | 3.11 | 1.68 | 0.67 | 0.74 |
| 3 | 0.21 | 91.55 | 7.14 | 1.01 | 0.05 | 0.02 | 0.02 |
| 8 | | 69.9 | 10.8 | 14.4 | 4.1 | 0.7 | 0.1 |
| 17 | | 14.72 | 6.82 | 31.83 | 24.00 | 8.92 | 13.71 |

Although the figures illustrate a system using three beds and two volume compensators, it will be obvious to those skilled in the art that the principle is applicable to systems using more or less than three sorption beds, for instance using two sorption beds and one valume compensator with a surge vessel such as in FIGURES 2–4 and 8 or even in a one-bed system or intermittent service. The words "sorption," "sorbent," etc., used herein are to connote the phenomena of adsorption and/or absorption. Although the system has been described for removing gasoline and/or water from natural gas, it applies broadly to removal of condensable vapor from gas, for example moisture from instrument air lines.

Having thus described the invention by providing specific examples thereof, it is to be understood that no undue limitations or restrictions are to be drawn by reason thereof and that many variations and modifications are within the scope of the invention.

What is claimed is:

1. In the method for removing vaporized condensables from a gas by sorption of the condensables in a bed of solid sorbent wherein the bed of solid sorbent is regenerated by passing therethrough a heated regeneration gas in a closed circuit, the improvement which comprises providing a compensator zone communicating with and downstream of the bed of solid sorbent being regenerated in the closed circuit, providing a heat regenerative material and void space in said compensator zone, said void space proportioned to provide at least partial and greater than minimal compensation for volumetric changes in the regeneration gas, and circulating heated regeneration gas through the bed being regenerated and the compensator zone, to replace heat removed from the regeneration gas during its passage through the solid sorbent bed and provide said compensation for volumetric changes in the regeneration gas.

2. In the method of claim 1 compensating volumetrically in said compensator zone for substantially all volumetric changes in the regeneration gas.

3. In the method for removing sorbed fluids from a bed of solid sorbent by passing a regeneration gas therethrough, the improvement which comprises:

(a) passing a heated regeneration gas through the bed of solid sorbent;

(b) cooling the gas passing from the bed of step (a) to effect condensing of condensables;

(c) separating the condensed condensables of step (b) from residue gas;

(d) providing a compensator zone containing heat regenerative material and void volume proportioned to provide at least partial and greater than minimal compensation for volumetric changes in the regeneration gas;

(e) passing the residue gas of step (c) through the compensator zone of step (d) to replace heat removed from the regeneration gas during its passage through the solid sorbent bed and provide said compensation for volumetric changes in the regeneration gas; and (f) heating the gas passing from the compensator zone of step (d) to provide the regeneration gas of step (a).

4. In the method of claim 3 providing a compensator zone containing heat regenerative material with void volume proportioned to compensate for substantially all volumetric changes in the regeneration gas.

5. In the removal of vaporized condensables from a gas utilizing the contact of sorbent material with the gas with resultant sorption of vaporized condensables by the sorbent material and the subsequent treatment of the sorbent material with a heated regeneration gas to vaporize and remove the condensables and to thereby regenerate the sorbent material for further contact with the gas containing vaporized condensables, the improvement which comprises:

(a) maintaining at least one bed of sorbent material in each of a plurality of zones;

(b) maintaining at least two of a plurality of compensator zones;

(c) maintaining within each of said compensator zones of (b) a heat regenerative material and a void volume proportioned to compensate for substantially all volume changes in said regeneration gas;

(d) continuously heating and recycling a flow of regeneration gas in a closed circuit through at least one of said beds of sorbent material and through one of said compensator zones which has been heated from a previous cycle, to vaporize condensed condensables contained on the sorbent in said bed and to regenerate sorbent material in said bed;

(e) continuously directing a flow of a cool gas through at least another one of said sorbent beds and through another compensator zone to cool said sorbent bed and to heat said competator zone;

(f) directing a flow of gas containing vaporized condensables through an additional one of said sorbent beds to remove condensables from said gas by sorption in said bed; and (g) periodically shifting the relative positions of the sorbent beds, the compensator zones, and the flow of gases in each of said beds and compensator zones so that each zone of step (a) becomes in succession a regeneration zone, a cooling zone, and a sorption zone, and each compensator zone in succession is heated by gas flowing from the bed being cooled and is cooled by gas flowing to the bed being regenerated;

whereby heat required for regeneration of sorbent is conserved and a volume balance is substantially maintained in the closed regeneration system.

6. The method of claim 5 wherein step (e) comprises:

(h) continuously cooling a gas;

(i) continuously directing the cool gas through at least one of said sorbent beds and through another compensator zone to cool said sorbent bed and to heat said compensator zone;

(j) recycling the gas from the compensator zone of (i) to step (h);

(k) thereafter discontinuing the recycle of said gas of (j); and (l) passing the gas leaving the compensator zone of (i) from the process.

7. In the method of claim 5, providing each of said beds of sorbent and each of said compensator zones with substantially equal heat capacities.

8. In the method of claim 5, varying the rate of flow of the regeneration gas of step (d) directly in proportion to the rate of flow of the gas containing vaporized condensables of step (f).

9. In the removal of vaporized condensables from a gas utilizing the contact of sorbent material with the gas with resultant sorption of vaporized condensables by the sorbent material and the subsequent treatment of the sorbent material with a heated regeneration gas to vaporize and remove the condensables and to thereby regenerate the sorbent material for further contact with the gas containing vaporized condensables, the improvement which comprises:

(a) maintaining at least one bed of sorbent material in each of a plurality of zones;

(b) maintaining at least two of a plurality of compensator zones;

(c) maintaining within each of said compensator zones of (b) a heat regenerative material and a void volume proportioned to compensate at least partially for volume changes in said regeneration gas;

(d) continuously heating and recycling a flow of regeneration gas in a closed circuit through at least one of said beds of sorbent material and through one of said compensator zones which has been heated from a previous cycle, to vaporize condensed condensables contained on the sorbent in said bed and to regenerate sorbent material in said bed;

(e) continuously directing a flow of a cool gas through at least another one of said sorbent beds and through another compensator zone to cool said sorbent bed and to heat said compensator zone;

(f) directing a flow of gas containing vaporized condensables through an additional one of said sorbent beds to remove condensables from said gas by sorption in said bed;

(g) periodically shifting the relative positions of the sorbent beds, the compensator zones, and the flow of gases in each of said beds and compensator zones so that each zone of step (a) becomes in succession a regeneration zone, a cooling zone, and a sorption zone, and each compensator zone in succession is heated by gas flowing from the bed being cooled and is cooled by gas flowing to the bed being regenerated; and (h) after a sorbent bed being regenerated has become regenerated and prior to changing the relative positions of the beds to begin a new cycle, the regeneration gas present in the sorbent bed which has been regenerated is displaced to the sorbent bed and compensator zone which will be in the next closed regeneration cycle and simultaneously the gas present in the sorbent bed which has just completed sorption is displaced therefrom;

whereby heat required for regeneration of sorbent is conserved, a volume balance is substantially maintained in the closed regeneration system, and the vaporized condensables contained in said regeneration gas are conserved.

10. The method as set forth in claim 9 wherein said compensator zone of step (h) which will be in the next closed regeneration cycle is bypassed.

11. In the removal of vaporized condensables from a gas utilizing the contact of sorbent material with the gas with resultant sorption of vaporized condensables by the sorbent material and the subsequent treatment of the sorbent material with a heated regeneration gas to vaporize and remove the condensables and to thereby regenerate the sorbent material for further contact with the gas containing vaporized condensables, the improvement which comprises:

(a) maintaining at least one bed of sorbent material in each of a plurality of zones;

(b) maintaining at least two of a plurality of compensator zones;

(c) maintaining within each of said compensator zones a heat regenerative material;
(d) providing each of said beds of sorbent and each of said compensator zones with substantially equal heat capacities;
(e) providing each of said beds of sorbent and each of said compensator zones with substantially equal void volume capacities;
(f) continuously heating and recycling a flow of regeneration gas in a closed circuit through at least one of said beds of sorbent material and through one of said compensator zones which has been heated from a previous cycle, to vaporize condensed condensables contained on the sorbent in said bed and to regenerate sorbent material in said bed;
(g) continuously directing a flow of a cool gas through at least another one of said sorbent beds and through another compensator zone to cool said sorbent bed and to heat said compensator zone;
(h) directing a flow of gas containing vaporized condensables through an additional one of said sorbent beds to remove condensables from said gas by sorption in said bed; and
(i) periodically shifting the relative positions of the sorbent beds, the compensator zones, and the flow of gases in each of said beds and compensator zones so that each zone of step (a) becomes in succession a regeneration zone, a cooling zone, and a sorption zone, and each compensator zone in succession is heated by gas flowing from the bed being cooled and is cooled by gas flowing to the bed being regenerated;

whereby heat required for regeneration of sorbent is conserved and a volume balance is substantially maintained in the closed regeneration system.

12. In the removal of vaporized condensables from a gas utilizing the contact of sorbent material with the gas with resultant sorption of vaporized condensables by the sorbent material and the subsequent treatment of the sorbent material with a heated regeneration gas to vaporize and remove the condensables and to thereby regenerate the sorbent material for further contact with the gas containing vaporized condensables, the improvement which comprises:
(a) maintaining at least one bed of sorbent material in each of a plurality of zones;
(b) maintaining at least two of a plurality of compensator zones;
(c) maintaining within each of said zones a heat regenerative material and a void volume proportioned to compensate for substantially all volume changes in regeneration gas;
(d) continuously heating and recycling a flow of regeneration gas in a closed circuit through at least one of said beds of sorbent material, a cooling zone, a separation zone and through one of said compensator zones which has been heated from a previous cycle, to vaporize condnesed condensables contained on the sorbent in said bed, and to regenerate sorbent material in said bed, and to condense and collect the vaporized condensables separately from said bed of sorbent material;
(e) continuously directing a flow of a cool gas through at least another one of said sorbent beds and through another compensator zone to cool said sorbent bed and to heat said compensator zone;
(f) directing a flow of gas containing vaporized condensables through an additional one of said sorbent beds to remove condensables from said gas by sorption in said bed; and
(g) periodically shifting the relative positions of the sorbent beds, the compensator zones, and the flow of gases in each of said beds and compensator zones so that each zone of step (a) becomes in succession a regeneration zone, a cooling zone, and an adsorption zone, and each compensator zone in succession is heated by gas flowing from the bed being cooled and is cooled by gas flowing from the bed being regenerated;

whereby heat required for regeneration of sorbent is conserved and a volume balance is maintained in the closed regeneration system.

13. In the method of claim 12, providing each of said zones containing sorbent and each of said compensator zones with substantially equal heat capacities.

14. In the removal of vaporized condensables from a gas utilizing the contact of sorbent material with the gas with resultant sorption of vaporized condensables by the sorbent material and the subsequent treatment of the sorbent material with a heated regeneration gas to vaporize and remove the condensables and to thereby regenerate the sorbent material for further contact with the gas containing vaporized condensables, the improvement which comprises:
(a) maintaining at least one bed of sorbent material in each of a plurality of zones;
(b) maintaining at least two of a plurality of compensator zones;
(c) maintaining within each of said compensator zones a heat regenerative material;
(d) providing each of said zones containing sorbent and each of said compensator zones with substantially equal heat capacities;
(e) providing each of said zones containing sorbent and each of said compensator zones further with substantially equal void volume capacities;
(f) continuously heating and recycling a flow of regeneration gas in a closed circuit through at least one of said beds of sorbent material, a cooling zone, a separation zone, and through one of said compensator zones which has been heated from a previous cycle, to vaporize condensed condensables contained on the sorbent in said bed, and to regenerate sorbent material in said bed, and to condense and collect the vaporized condensables separately from said bed of sorbent material;
(g) continuously directing a flow of a cool gas through at least another one of said sorbent beds and through another compensator zone to cool said sorbent bed and to heat said compensator zone;
(h) directing a flow of gas containing vaporized condensables through an additional one of said sorbent beds to remove condensables from said gas by sorption in said bed; and
(i) periodically shifting the relative positions of the sorbent beds, the compensator zones, and the flow of gases in each of said beds and compensator zones so that each zone of step (a) becomes in succession a regeneration zone, a cooling zone, and an adsorption zone, and each compensator zone in succession is heated by gas flowing from the bed being cooled and is cooled by gas flowing from the bed being regenerated;

whereby heat required for regeneration of sorbent is conserved and a volume balance is maintained in the closed regeneration system.

15. In the removal of vaporized condensables from a gas utilizing the contact of sorbent material with the gas with resultant sorption of vaporized condensables by the sorbent material and the subsequent treatment of the sorbent material with a heated regeneration gas to vaporize and remove the condensables and to thereby regenerate the sorbent material for further contact with the gas containing vaporized condensables, the improvement which comprises:
(a) maintaining at least one bed of sorbent material in each of a plurality of zones;
(b) maintaining at least two of a plurality of compensator zones;
(c) maintaining within each of said compensator zones a heat regenerative material and a void volume proportioned to compensate at least partially for volume changes in regeneration gas;

(d) continuously heating and recycling a flow of regeneration gas in a closed circuit through at least one of said beds of sorbent material, a cooling zone, a separation zone and through one of said compensator zones which has been heated from a previous cycle, to vaporize condensed condensables contained on the sorbent in said bed, to regenerate sorbent material in said bed, and to condense and collect the vaporized condensables separately from said bed of sorbent material;

(e) continuously directing a flow of a cool gas through at least another one of said sorbent beds and through another compensator zone to cool said sorbent bed and to heat said compensator zone;

(f) directing a flow of gas containing vaporized condensables through an additional one of said sorbent beds to remove condensables from said gas by sorption in said bed;

(g) periodically shifting the relative positions of the sorbent beds, the compensator zones, and the flow of gases in each of said beds and compensator zones so that each zone of step (a) becomes in succession a regeneration zone, a cooling zone, and an adsorption zone, and each compensator zone of step (b) in succession is heated by gas flowing from the bed being cooled and is cooled by gas flowing from the bed being regenerated; and (h) after the bed being regenerated has become regenerated and prior to changing the relative positions of the beds to begin a new cycle, the regeneration gas present in the bed of step (d) is displaced with cool gas directly to the compensator zone of step (d), bypassing the cooling and separating zones, and to the sorbent bed and zones which will be in the next closed regeneration circuit and simultaneously the gas present in the sorbent bed of step (f) is displaced with heated gas to the compensator zone of step (e) and from the system;

whereby heat required for regeneration of sorbent is conserved and a volume balance is maintained in the closed regeneration system.

16. The method of claim 15 wherein the change from one to the next subsequent phase of a given cycle is effected in response to measurement of effluent temperature of the bed of sorbent of step (d).

17. The method of claim 15 wherein the change from one to the next subsequent phase of a given cycle is effected in response to measurement of effluent temperature of one of said compensator zones.

18. In the method of claim 15, providing a zone of variable volumetric capacity which is accessible to said regeneration gas.

19. In the removal of vaporized condensables from a gas utilizing the contact of sorbent material with the gas with resultant sorption of vaporized condensables by the sorbent material and the subsequent treatment of the sorbent material with a heated regeneration gas to vaporize and remove the condensables and to thereby regenerate the sorbent material for further contact with the gas containing vaporized condensables, the improvement which comprises:

(a) maintaining at least one bed of sorbent material in each of a plurality of zones;

(b) maintaining at least two of a plurality of compensator zones;

(c) maintaining within each of said compensator zones a heat regenerative material and a void volume proportioned to compensate at least partially for volume changes in regeneration gas;

(d) continuously heating and recycling a flow of regeneration gas in a closed circuit through at least one of said beds of sorbent material, a cooling zone, a separation zone and through one of said compensator zones which has been heated from a previous cycle, to vaporize condensed condensables contained on the sorbent in said bed, to regenerate sorbent material in said bed, and to condense and collect the vaporized condensables separately from said bed of sorbent material;

(e) continuously directing a flow of a cool gas through at least another one of said sorbent beds and through another compensator zone to cool said sorbent bed and to heat said compensator zone;

(f) directing a flow of gas containing vaporized condensables through an additional one of said sorbent beds to remove condensables from said gas by sorption in said bed;

(g) periodically shifting the relative positions of the sorbent beds, the compensator zones, and the flow of gases in each of said beds and compensator zones so that each zone of step (a) becomes in succession a regeneration zone, a cooling zone, and an adsorption zone, and each compensator zone in succession is heated by gas flowing from the bed being cooled and is cooled by gas flowing from the bed being regenerated; and (h) after the bed being regenerated has become regenerated and prior to changing the relative positions of the beds to begin a new cycle, the regeneration gas present in the bed of step (d) is displaced with cool gas directly to the compensator zone of step (d), bypassing the cooling and separating zones, and to the sorbent bed and zones which will be in the next closed regeneration circuit and simultaneously the gas present in the sorbent bed of step (f) is displaced with heated gas to the compensator zone of step (e) and from the system;

whereby heat required for regeneration of sorbent is conserved and a volume balance is maintained in the closed regeneration system.

20. The method of claim 19 wherein the regeneration gas present in the bed of step (d) is displaced through the cooling and separating zones prior to entering the compensator zone of step (d).

21. In the removal of vaporized condensables from a gas utilizing the contact of sorbent material with the gas with resultant sorption of vaporized condensables by the sorbent material and the subsequent treatment of the sorbent material with a heated regeneration gas to vaporize and remove the condensables and to thereby regenerate the sorbent material for further contact with the gas containing vaporized condensables, the improvement which comprises:

(a) maintaining at least one bed of sorbent material in each of a plurality of zones;

(b) maintaining at least two of a plurality of compensator zones;

(c) maintaining within each of said compensator zones a heat regenerative material and a void volume proportioned to compensate at least partially for volume changes in regeneration gas;

(d) continuously heating and recycling a flow of regeneration gas in a closed circuit through at least one of said beds of sorbent material, a cooling zone, a separation zone and through one of said compensator zones which has been heated from a previous cycle, to vaporize condensed condensables contained on the sorbent in said bed, and to regenerate sorbent material in said bed, and to condense and collect the vaporized condensables separately from said bed of sorbent material;

(e) continuously directing a flow of a cool gas through at least another one of said sorbent beds and through another compensator zone to cool said sorbent bed and to heat said compensator zone;

(f) directing a flow of gas containing vaporized condensables through an additional one of said sorbent beds to remove condensables from said gas by sorption in said bed;

(g) periodically shifting the relative positions of the sorbent beds, the compensator zones, and the flow of gases in each of said beds and compensator zones so that each zone of step (a) becomes in succession a regeneration zone, a cooling zone, and an adsorption zone, and each compensator zone in succession is heated by gas flowing from the bed being cooled and is cooled by gas flowing from the bed being regenerated; and (h) after the bed being regenerated has become regenerated and prior to changing the relative positions of the beds, the regeneration gas present in the bed of step (d) is displaced with cool gas directly to the compensator zones of steps (d) and (e) in sequence, bypassing the cooling and separating zones, and simultaneously the gas present in the sorbent bed of step (f) is displaced from the system with a heated gas;

whereby heat required for regeneration of sorbent is conserved and a volume balance is maintained in the closed regeneration system.

22. The method of claim 21 wherein the gas displaced from the sorbent bed of step (f) passes through the cooling and separating zones.

23. The method of claim 21 wherein the gas displaced from the sorbent bed of step (f) bypasses the cooling and separating zones.

24. In the removal of vaporized condensables from a gas utilizing the contact of sorbent material with the gas with resultant sorption of vaporized condensables by the sorbent material and the subsequent treatment of the sorbent material with a heated regeneration gas to vaporize and remove the condensables and to thereby regenerate the sorbent material for further contact with the gas containing vaporized condensables, the improvement which comprises:

(a) maintaining at least one bed of sorbent material in each of a plurality of zones;

(b) maintaining at least two of a plurality of compensator zones;

(c) maintaining within each of said compensator zones a heat regenerative material and a void volume proportioned to compensate at least partially for volume changes in regeneration gas;

(d) continuously heating and recycling a flow of regeneration gas in a closed circuit through at least one of said beds of sorbent material, a cooling zone, a separation zone and through one of said compensator zones which has been heated from a previous cycle, to vaporize condensed condensables contained on the sorbent in said bed, and to regenerate sorbent material in said bed, and to condense and collect the vaporized condensables separately from said bed of sorbent material;

(e) continuously directing a flow of a cool gas through at least another one of said sorbent beds and through another compensator zone to cool said sorbent bed and to heat said compensator zone;

(f) directing a flow of gas containing vaporized condensables through an additional one of said sorbent beds to remove condensables from said gas by sorption in said bed; and (g) periodically shifting the relative positions of the sorbent beds, the compensator zones, and the flow of gases in each of said beds and compensator zones so that each zone of step (a) becomes in succession a regeneration zone, a cooling zone, and an adsorption zone, and each compensator zone in succession is heated by gas flowing from the bed being cooled and is cooled by gas flowing from the bed being regenerated and after the bed being regenerated has become regenerated and prior to changing the related positions of the beds to begin a new cycle;

(h) a cool gas is passed through a heat exchanger thereby becoming heated;

(i) the gas of step (h) is passed into the sorbent bed of step (d) and the compensator zone of step (d);

(j) the gas present in the sorbent bed of step (d) and the compensator zone of step (d) is displaced through the heat exchanger of step (h) and into the sorbent bed of step (f) and the compensator zone of step (e); and (k) the gas present in the sorbent bed of step (f) and the compensator zone of step (e) is displaced from the system;

whereby heat required for regeneration of sorbent is conserved and a volume balance is maintained in the closed regeneration system.

25. The method of claim 24 wherein the gas displaced from the sorbent bed of step (d) and the compensator zone of step (d) passes through the cooling and separating zones.

26. Apparatus for separation of vaporized condensables from gas by cyclic sorption which comprises:

(a) a plurality of vessels containing a solid sorbent;

(b) a plurality of vessels containing solid heat accumulating medium and having a void volumetric capacity therein sufficient to compensate for substantially all gas expansion therein;

(c) a source of gas containing vaporized condensables;

(d) a point of utility for gas from which condensables have been removed;

(e) a point of utility for condensed condensables;

(f) heating means;

(g) cooling means;

(h) a plurality of first conduit means communicating between said source of (c) and each of said vessels of (a);

(i) a plurality of second conduit means communicating between said point of utility of (d) and each of said vessels of (a);

(j) a plurality of third conduit means communicating between each of said vessels of (a) and each of said vessels of (b);

(k) a plurality of fourth conduit means communicating between each of said vessels of (b) and said point of utility of (d);

(l) a plurality of fifth conduit means communicating between each of said vessels of (a) and said cooling means of (g);

(m) a gas-liquid separator;

(n) sixth conduit means communicating between said cooling means of (g) and said separator of (m);

(o) seventh conduit means communicating between said separating means of (m) and said point of utility of (e);

(p) a plurality of eighth conduit means communicating between said separator of (m) and said vessels of (b);

(q) a plurality of ninth conduit means communicating between said vessels of (b) and said heating means of (f);

(r) a plurality of tenth conduit means communicating between said heating means of (f) and said vessels of (a);

(s) a source of cool gas;

(t) a plurality of eleventh conduit means communicating between said source of (s) and said vessels of (a); and (u) valve means in each of said plurality of first, second, third, fourth, fifth, eighth, ninth, tenth, and eleventh conduit means of (h), (i), (j), (k), (l), (p), (q), (r), and (t), respectively.

27. The apparatus of claim 26 wherein said source of cool gas comprises:

(gg) means for circulating a stream of gas;

(hh) a second cooling means;

(ii) twelfth conduit means communicating between said plurality of second conduit means (i) and said means for circulating (gg);

(jj) thirteenth conduit means communicating between said means for circulating (gg) and said second cooling means (hh); and (kk) valve means in twelfth conduit means (ii).

28. The apparatus of claim 27 further provided with bypass conduit means communicating between said fifth conduit means (l) and said eighth conduit means (p).

29. The apparatus of claim 28; and valved conduit means connecting said eighth conduit means (p) and said cooling means (g), and a valve in said eighth conduit (p) means downstream of the junction of said valved conduit means and said eighth conduit means (p).

30. The apparatus of claim 26 and valved conduit means connecting said plurality of third conduit means (j) and said plurality of second conduit means (i).

31. The apparatus of claim 26 and bypass conduit means communicating between said plurality of conduit means (k) and said plurality of second conduit means (i).

32. Apparatus of claim 26 wherein the heat capacity of each of said vessels (a) and its contents and each of said vessels (b) and its contents are substantially equal.

33. Apparatus of claim 32 wherein the void volumetric capacity of each of said vessels (a) and its contents and each of said vessels (b) and its contents are substantially equal.

34. Apparatus of claim 26 further provided with bypass conduit means communicating between said fifth conduit means of (l) and said eighth conduit means of (p).

35. Apparatus of claim 34 wherein said valve means of (u) are actuated responsive to a temperature sensing means operatively communicating with a space in one of said vessels (a).

36. Apparatus of claim 34 wherein said valve means of (u) are actuated responsive to a temperature sensing means operatively communicating with a space in one of said vessels (b).

37. Apparatus of claim 26 further provided with a variable volume vessel operatively communicating with said third conduit means of (j).

38. Apparatus of claim 26 further provided with a variable volume vessel operatively communicating with said fifth conduit means of (l).

39. Apparatus of claim 26 further provided with a variable volume vessel operatively communicating with said eighth conduit means of (p).

40. The apparatus of claim 26; and (v) twelfth conduit means communicating between said plurality of ninth conduit means (q) and said second conduit means (i); and (w) valve means in said ninth conduit means (q) and in said twelfth conduit means (v).

41. The apparatus of claim 26; and (aa) thirteenth conduit means communicating between said plurality of second conduit means (i) and said plurality of ninth conduit means (q);

(bb) fourteenth conduit means communicating between said eleventh plurality of conduit means (t) and said plurality of ninth conduit means (q);

(cc) valve means in said fourteenth conduit means (bb);

(dd) valve means in said conduit means (aa) intermediate the junction between thirteenth conduit means (aa) and ninth conduit means (q) and the junction between thirteenth conduit means (aa) and said plurality of second conduit means (i);

(ee) valve means in conduit means (q) intermediate the junction between thirteenth conduit means (aa) and ninth conduit means (q) and the junction between ninth conduit means (q) and fourteenth conduit means (bb); and (ff) a heat exchanger through which conduit means (aa) and (bb) thermally communicate.

42. In the apparatus of claim 26, means for maintaining the flow of fluids in first conduit means (h) at a rate proportioned to the flow of fluids in eighth conduit means (p).

43. In an apparatus for regenerating a bed of solid sorbent containing sorbed vapors by circulating a regenerating gas therethrough, said apparatus comprising respectively a bed of solid sorbent, cooling means, separating means, heating means, a first conduit connecting said bed of solid sorbent and said cooling means, a second conduit connecting said cooling means and said separating means, a third conduit connecting said separating means and said heating means, and a fourth conduit connecting said heating means and said bed of solid sorbent in closed recirculating communication, the improvement comprising a compensator intermediate said separating means and said heating means and communicating with said separating means and said heating means, said compensator containing heat regenerative material to replace heat removed from the regeneration gas during its passage through the solid sorbent bed and having void space proportioned to compensate for substantially all volumetric changes in the regeneration gas.

44. The apparatus of claim 43 wherein said compensator has a void volume substantially equal to the void volume of said bed of solid sorbent.

45. In an apparatus for regenerating a bed of solid sorbent containing sorbed vapors by circulating a regenerating gas therethrough, said apparatus comprising respectively a bed of solid sorbent, cooling means, separating means, heating means, a first conduit connecting said bed of solid sorbent and said cooling means, a second conduit connecting said cooling means and said separating means, a third conduit connecting said separating means and said heating means, and a fourth conduit connecting said heating means and said bed of solid sorbent in closed recirculating communication, the improvement comprising a compensator intermediate said separating means and said heating means and communicating with said separating means and said heating means, said compensator containing heat regenerative material to replace heat removed from the regeneration gas during its passage through said bed of solid sorbent, having a void volume substantially equal to the void volume of said bed of solid sorbent, and having a heat capacity per unit of void volume substantially equal to the heat capacity per unit of void volume of said bed of solid sorbent.

46. In an apparatus for regenerating a bed of solid sorbent containing sorbed vapors by circulating a regenerating gas therethrough, said apparatus comprising respectively a bed of solid sorbent, cooling means, separating means, heating means, a first conduit connecting said bed of solid sorbent and said cooling means, a second conduit connecting said cooling means and said separating means, a third conduit connecting said separating means and said heating means, and a fourth conduit connecting said heating means and said bed of solid sorbent in closed recirculating communication, the improvement comprising a compensator intermediate said separating means and said heating means and communicating with said separating means and said heating means, said compensator containing heat regenerative material to replace heat removed from the regeneration gas during its passage through said bed of solid sorbent, having a void volume substantially equal to the void volume of said bed of solid sorbent, and having a total heat capacity approximately equal to the total heat capacity of said bed of solid sorbent.

References Cited
UNITED STATES PATENTS

| | | | |
|---|---|---|---|
| 487,723 | 12/1892 | De Rycke | 55—267 |
| 2,675,089 | 4/1954 | Kahle | 55—52 |
| 2,730,239 | 1/1956 | Peery | 210—175 X |

(Other references on following page)

UNITED STATES PATENTS

| | | |
|---|---|---|
| 2,919,764 | 1/1960 | Dillman et al. _____ 55—62 X |
| 2,995,208 | 8/1961 | Hachmuth et al. _____ 55—62 X |
| 3,137,549 | 6/1964 | Kilgore et al. _____ 55—62 X |
| 3,186,144 | 6/1965 | Dow _____ 55—62 X |
| 3,230,689 | 1/1966 | Hussmann _____ 55—28 |
| 770,787 | 9/1904 | Thomson _____ 261—94 X |
| 2,323,524 | 7/1943 | Downs _____ 55—62 X |

REUBEN FRIEDMAN, *Primary Examiner.*

J. ADEE, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,405,507                          October 15, 1968

John R. Spencer et al.

It is certified that error appears in the above identified patent and that said Letters Patent are hereby corrected as shown below:

Column 14, TABLE III, under the heading "63" line 3 thereof, "O" should read -- C --. Column 19, in the table, first column, line 2 thereof, "8" should read -- 3 --; same table, same column, line 3 thereof, "3" should read -- 8 --.

Signed and sealed this 27th day of January 1970.

(SEAL)
Attest:

Edward M. Fletcher, Jr.                  WILLIAM E. SCHUYLER, JR.
Attesting Officer                            Commissioner of Patents